US012580676B2

(12) United States Patent
Liu et al.

(10) Patent No.: US 12,580,676 B2
(45) Date of Patent: Mar. 17, 2026

(54) MODULATION AND CODING SCHEME MCS SELECTION METHOD AND COMMUNICATION APPARATUS

(71) Applicant: HUAWEI TECHNOLOGIES CO., LTD., Shenzhen (CN)

(72) Inventors: Qing Liu, Shanghai (CN); Lei Zheng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 18/192,068

(22) Filed: Mar. 29, 2023

(65) Prior Publication Data

US 2023/0239069 A1     Jul. 27, 2023

Related U.S. Application Data

(63) Continuation of application No. PCT/CN2020/119748, filed on Sep. 30, 2020.

(51) Int. Cl.
H04L 1/00          (2006.01)
G06N 3/08          (2023.01)
(Continued)

(52) U.S. Cl.
CPC ............. H04L 1/0003 (2013.01); G06N 3/08 (2013.01); H04L 1/0009 (2013.01); H04L 1/0019 (2013.01)

(58) Field of Classification Search
CPC ... H04L 1/0003; H04L 1/0009; H04L 1/0019; G06N 3/08
(Continued)

(56) References Cited

U.S. PATENT DOCUMENTS

2014/0307645 A1* 10/2014 Ji ........................... H04L 5/0053
                                                            370/329
2016/0345343 A1* 11/2016 Elsherif ............... H04B 7/0689
(Continued)

FOREIGN PATENT DOCUMENTS

CN          103222326 A      7/2013
CN          104272632 A      1/2015
(Continued)

OTHER PUBLICATIONS

Vidit Saxena et al., "Deep Learning for Frame Error Probability Prediction in BICM-OFDM Systems." 2018 IEEE International Conference on Acoustics, Speech and Signal Processing (ICASSP), Sep. 13, 2018; 5 total pages.
(Continued)

*Primary Examiner* — Xuan Lu
(74) *Attorney, Agent, or Firm* — Rimon PC

(57)          ABSTRACT

This application provides a modulation and coding scheme (MCS) selection method. In the method, a first communication device determines a predicted block error rate that corresponds to each MCS of a plurality of MCSs at a transmission time interval (TTI) 1 by using a neural network model, where a prediction parameter that corresponds to each MCS includes a channel parameter and the MCS. The first communication device selects, from the plurality of MCSs based on the plurality of MCSs and the predicted block error rate that corresponds to each MCS, a target MCS that corresponds to the TTI 1, and sends data to a second communication device at the TTI 1 based on the target MCS. The method disclosed herein helps improve channel transmission performance.

17 Claims, 9 Drawing Sheets

Schematic flowchart of a BLER prediction network

(51) Int. Cl.
    *H04B 7/0452* (2017.01)
    *H04L 1/1825* (2023.01)
    *H04W 72/54* (2023.01)

(58) Field of Classification Search
    USPC ........................................................ 370/252
    See application file for complete search history.

(56) References Cited

U.S. PATENT DOCUMENTS

| | | | | |
|---|---|---|---|---|
| 2021/0075691 A1* | 3/2021 | Zeng | ..................... | H04L 5/0048 |
| 2022/0394635 A1* | 12/2022 | Min | ................... | H04W 52/245 |

FOREIGN PATENT DOCUMENTS

| | | |
|---|---|---|
| CN | 106027184 A | 10/2016 |
| WO | 2008120159 A2 | 10/2008 |
| WO | 2012101482 A1 | 8/2012 |
| WO | 2018034713 A1 | 2/2018 |

OTHER PUBLICATIONS

Lissy Pellaco et al., "Wireless link adaptation with outdated CSI—a hybrid data-driven and model-based approach," 2020 IEEE 21st International Workshop on Signal Processing Advances in Wireless Communications (SPAWC), May 26, 2020; 5 total pages.

\* cited by examiner

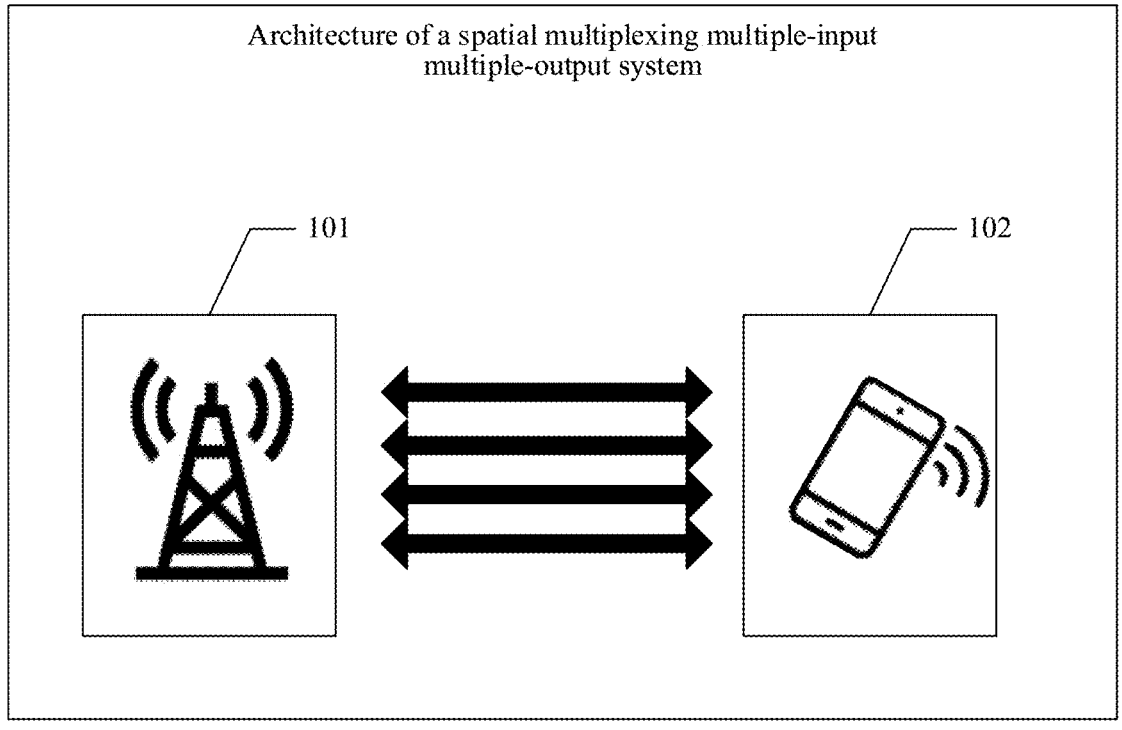

Architecture of a spatial multiplexing multiple-input multiple-output system

FIG. 1

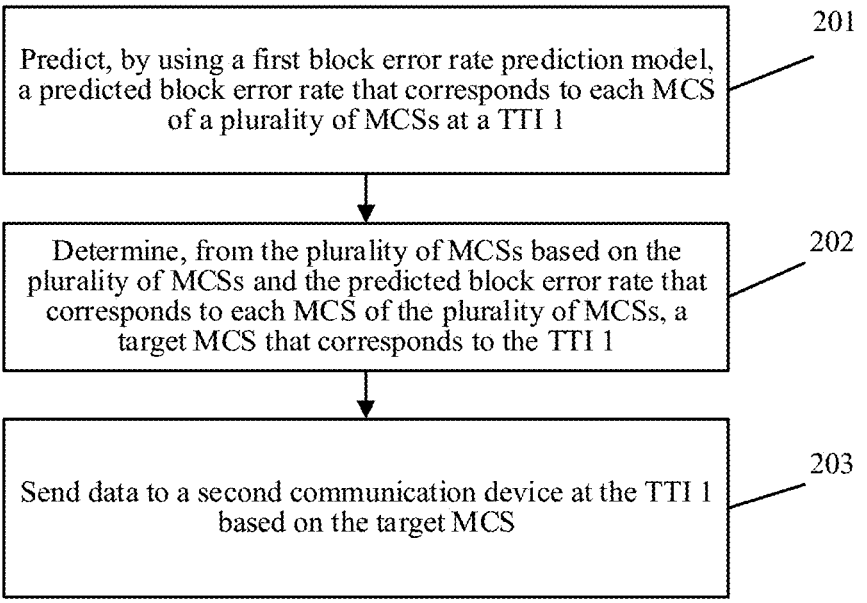

Predict, by using a first block error rate prediction model, a predicted block error rate that corresponds to each MCS of a plurality of MCSs at a TTI 1 — 201

Determine, from the plurality of MCSs based on the plurality of MCSs and the predicted block error rate that corresponds to each MCS of the plurality of MCSs, a target MCS that corresponds to the TTI 1 — 202

Send data to a second communication device at the TTI 1 based on the target MCS — 203

FIG. 2

Schematic flowchart of a BLER prediction network

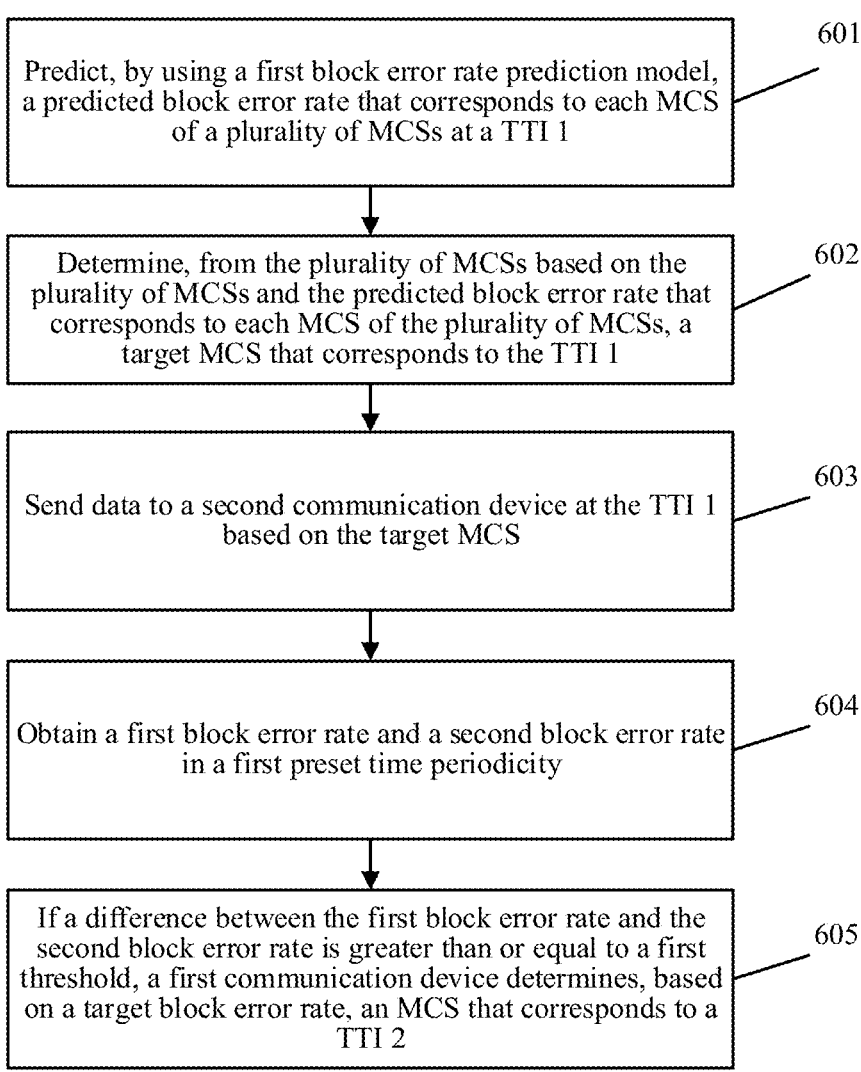

601

Predict, by using a first block error rate prediction model, a predicted block error rate that corresponds to each MCS of a plurality of MCSs at a TTI 1

602

Determine, from the plurality of MCSs based on the plurality of MCSs and the predicted block error rate that corresponds to each MCS of the plurality of MCSs, a target MCS that corresponds to the TTI 1

603

Send data to a second communication device at the TTI 1 based on the target MCS

604

Obtain a first block error rate and a second block error rate in a first preset time periodicity

605

If a difference between the first block error rate and the second block error rate is greater than or equal to a first threshold, a first communication device determines, based on a target block error rate, an MCS that corresponds to a TTI 2

FIG. 6

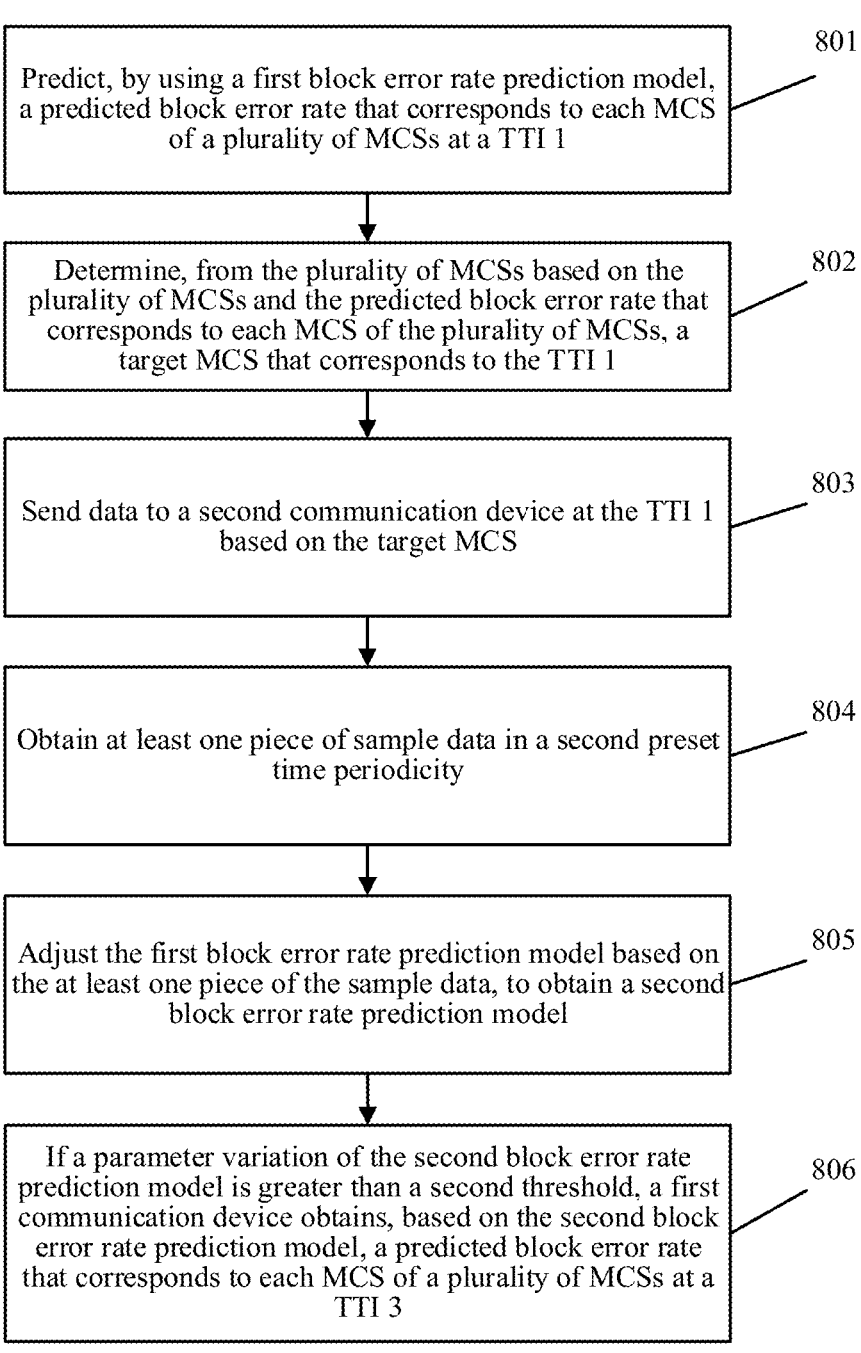

Predict, by using a first block error rate prediction model, a predicted block error rate that corresponds to each MCS of a plurality of MCSs at a TTI 1

801

Determine, from the plurality of MCSs based on the plurality of MCSs and the predicted block error rate that corresponds to each MCS of the plurality of MCSs, a target MCS that corresponds to the TTI 1

802

Send data to a second communication device at the TTI 1 based on the target MCS

803

Obtain at least one piece of sample data in a second preset time periodicity

804

Adjust the first block error rate prediction model based on the at least one piece of the sample data, to obtain a second block error rate prediction model

805

If a parameter variation of the second block error rate prediction model is greater than a second threshold, a first communication device obtains, based on the second block error rate prediction model, a predicted block error rate that corresponds to each MCS of a plurality of MCSs at a TTI 3

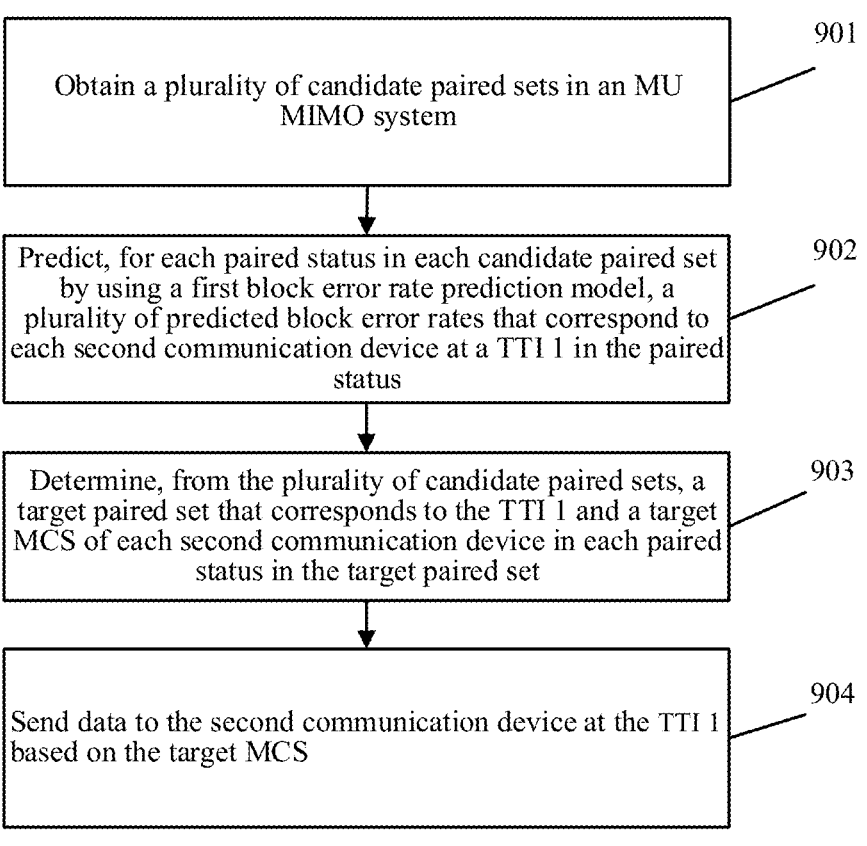

| |
|---|
| Obtain a plurality of candidate paired sets in an MU MIMO system | 901 |
| Predict, for each paired status in each candidate paired set by using a first block error rate prediction model, a plurality of predicted block error rates that correspond to each second communication device at a TTI 1 in the paired status | 902 |
| Determine, from the plurality of candidate paired sets, a target paired set that corresponds to the TTI 1 and a target MCS of each second communication device in each paired status in the target paired set | 903 |
| Send data to the second communication device at the TTI 1 based on the target MCS | 904 |

FIG. 9

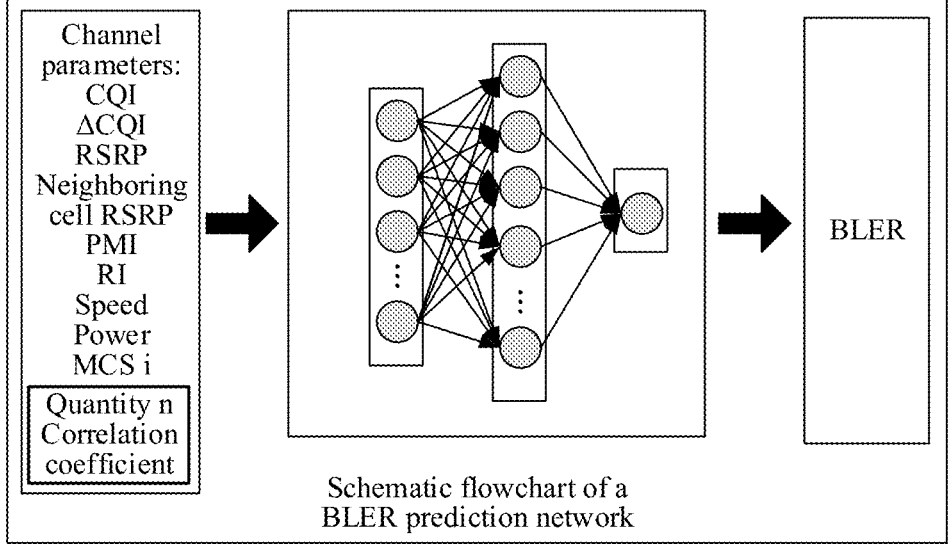

Channel parameters:
CQI
ΔCQI
RSRP
Neighboring cell RSRP
PMI
RI
Speed
Power
MCS i Quantity n
Correlation coefficient

BLER

Schematic flowchart of a
BLER prediction network

FIG. 10

MODULATION AND CODING SCHEME MCS SELECTION METHOD AND COMMUNICATION APPARATUS

CROSS-REFERENCE TO RELATED APPLICATIONS

This application is a continuation of International Application No. PCT/CN2020/119748, filed on Sep. 30, 2020, the disclosure of which is hereby incorporated by reference in its entirety.

TECHNICAL FIELD

This application relates to the field of communication technologies, and in particular, to a modulation and coding scheme (MCS) selection method and a communication apparatus.

BACKGROUND

In a wireless communication signal transmission process, various interference and fading exist, and consequently, channel quality fluctuates greatly. In order to improve transmission performance of a current channel, for example, increase a transmission rate to maximize a channel capacity, a modulation and coding scheme (MCS) suitable for the current channel transmission condition is usually selected based on an adaptive modulation and coding (AMC) technology to configure a physical transmission rate of the channel. A specific process in which a signal transmitting end performs adaptive MCS selection may be described as follows: The signal transmitting end obtains quality information of the current channel by way of feedback from a signal receiving end or by way of equivalent measurement using an uplink and downlink reciprocity characteristic of a channel, so that the signal transmitting end can select an appropriate MCS based on the quality information of the current channel. However, due to factors such as feedback delay, measurement errors, and quantization errors, a measurement result of the quality information of the current channel usually deviates from the actual channel quality during the MCS selection.

Currently, a channel quality indicator (CQI) obtained by the transmitting end may be corrected using an open link loop adaptable (OLLA) adjustment algorithm. To be specific, a block error rate reaches a preset target block error rate (BLER) of the current channel by adjusting an accumulated adjustment amount to ensure stability of a value of the channel quality indicator. Because the preset target block error rate is obtained through simulation calculation based on an experimental scenario and often deviates from an optimal target block error rate in a real scenario, a target MCS determined based on the preset target block error rate usually leads to low channel transmission performance.

SUMMARY

This application provides a modulation and coding scheme (MCS) selection method and a communication apparatus. The MCS selected by the method and apparatus disclosed herein helps improve transmission performance of a current channel.

According to a first aspect, this application provides a modulation and coding scheme (MCS) selection method. The method includes: A first communication device predicts, by using a first block error rate prediction model, a predicted block error rate that corresponds to each MCS of a plurality of MCSs at a transmission time interval (TTI) 1, where a prediction parameter that corresponds to each MCS includes one or more channel parameters and the MCS, and the first block error rate prediction model is a neural network model. Further, the first communication device selects from the plurality of MCSs, based on the plurality of MCSs and the predicted block error rate that corresponds to each MCS of the plurality of MCSs, a target MCS that corresponds to the TTI 1, and sends data to a second communication device at the TTI 1 based on the target MCS.

Based on the method described in the first aspect, the first communication device may invoke the first block error rate prediction model to predict predicted block error rates in different channel states in real time, to select, from the plurality of MCSs based on the predicted block error rates in the different channel states, an MCS that enables optimal transmission performance of a current channel.

In a possible implementation, the target MCS and a predicted block error rate that corresponds to the target MCS maximize a spectral efficiency or a throughput of the TTI 1. The target MCS determined based on the possible implementation can improve a spectral efficiency or a throughput of a channel.

In a possible implementation, after the first communication device sends the data to the second communication device at the TTI 1 based on the target MCS, the first communication device obtains a first block error rate and a second block error rate in a first preset time period, where the first block error rate is an actual statistical block error rate in the first preset time period, and the second block error rate is a predicted block error rate that corresponds to the first preset time period and is obtained based on the first block error rate prediction model. If a difference between the first block error rate and the second block error rate is greater than or equal to a first threshold, the first communication device determines, based on a target block error rate, an MCS that corresponds to a TTI 2, where the TTI 2 is later than the TTI 1. Based on this possible implementation, the model accuracy of the first block error rate prediction model may be periodically monitored. When it is detected that a prediction result of the first block error rate prediction model is inaccurate, an MCS used for sending data at a subsequent TTI may be determined in another manner, and this improves channel robustness.

In a possible implementation, the first preset time period includes a plurality of TTIs. The first communication device obtains a decoding result of each TTI of the plurality of TTIs and the predicted block error rate that corresponds to the target MCS at each TTI. Further, the first communication device determines the first block error rate based on the decoding result of each TTI, and obtains the second block error rate based on the predicted block error rate that corresponds to the target MCS at each TTI. Based on this possible implementation, the first block error rate and the second block error rate can be accurately determined.

In a possible implementation, after the first communication device sends the data to the second communication device at the TTI 1 based on the target MCS, the first communication device obtains at least one piece of sample data in a second preset time period. The sample data includes a channel parameter, an MCS, and a sample block error rate. The sample block error rate is obtained based on decoding results that respectively correspond to a plurality of TTIs, and channel parameters and MCSs of the plurality of TTIs are consistent. Further, the first communication device adjusts the first block error rate prediction model based on the at least one piece of sample data, to obtain a second block error rate prediction model. If a parameter variation of the second block error rate prediction model is greater than a second threshold, the first communication device obtains, based on the second block error rate prediction model, a predicted block error rate that corresponds to each MCS of a plurality of MCSs at a TTI 3, where the TTI 3 is later than the TTI 1. Based on this implementation, the first communication device continuously collects data in an actual application scenario to train and adjust the first block error rate prediction model, to avoid a case in which the first block error rate prediction model mismatches a changing channel condition scenario and improve the accuracy and robustness of the first block error rate prediction model.

In a possible implementation, the channel parameter includes: a channel quality indicator of the TTI 1, a variation between the channel quality indicator of the TTI 1 and a channel quality indicator of a previous TTI, a reference signal received power, a precoding matrix indicator, a rank indicator, a signal transmission speed, and a transmission power of a current cell, and a reference signal received power, a precoding matrix indicator, a rank indicator, a signal transmission speed, or a transmission power of a neighboring cell. Based on this possible implementation, the accuracy of the first block error rate prediction model can be improved.

In a possible implementation, the first communication device and the second communication device are communication devices in a multi-user multiple-input multiple-output (MU MIMO) system, and the channel parameter further includes a quantity of second communication devices sharing a same channel resource and a correlation coefficient between the second communication devices. Based on this possible implementation, an input channel parameter of the first block error rate prediction model in the MU MIMO system is determined, so that the accuracy of the first block error rate prediction model in the MU MIMO system can be further improved.

In a possible implementation, the first communication device obtains a plurality of candidate paired sets in the MU MIMO system, where the candidate paired sets include a paired status of one or more second communication devices. Further, the first communication device obtains a plurality of candidate paired sets at the TTI 1 by using the first block error rate prediction model, where the candidate paired sets include a paired status of one or more second communication devices. The first communication device predicts, for each paired status in each candidate paired set by using the first block error rate prediction model, a plurality of predicted block error rates that correspond to each second communication device at the TTI 1 in the paired status. The predicted block error rate in the plurality of predicted block error rates is in a one-to-one correspondence with the MCS in the plurality of MCSs. Further, the first communication device determines, from the plurality of candidate paired sets based on the plurality of MCSs and the plurality of predicted block error rates that correspond to each second communication device at the TTI 1 in each paired status in each candidate paired set, a target paired set that corresponds to the TTI 1 and a target MCS of each second communication device in each paired status in the target paired set. Based on this possible implementation, the first communication device may determine the paired status of the plurality of second communication devices at the TTI 1 and the target MCS that corresponds to each second communication device, to improve channel transmission performance.

According to a second aspect, a communication apparatus is provided. The apparatus may be a first communication device, an apparatus in the first communication device, or an apparatus that can be used together with the first communication device. The communication apparatus may alternatively be a chip system. The communication apparatus may perform the method according to the first aspect. A function of the communication apparatus may be implemented by hardware, or may be implemented by hardware executing corresponding software. The hardware or the software includes one or more units (e.g., circuits) that correspond to the functions. The unit may be software and/or hardware. For operations performed by the communication apparatus and beneficial effects thereof, refer to the method in the first aspect and the beneficial effects thereof, which are not described again.

According to a third aspect, this application provides a communication apparatus. The communication apparatus includes a processor. When the processor invokes a computer program in a memory, the method performed by the first communication device in the method according to the first aspect is performed.

According to a fourth aspect, this application provides a communication apparatus. The communication apparatus includes a processor and a memory. The memory is configured to store computer-executable instructions. The processor is configured to execute the computer-executable instructions stored in the memory, so that the communication apparatus performs the method performed by the first communication device in the method according to the first aspect.

According to a fifth aspect, this application provides a communication apparatus. The communication apparatus includes a processor, a memory, and a transceiver. The transceiver is configured to receive a signal or send a signal. The memory is configured to store a computer program. The processor is configured to invoke the computer program from the memory to perform the method performed by the first communication device in the method according to the first aspect.

According to a sixth aspect, this application provides a communication apparatus. The communication apparatus includes a processor and an interface circuit. The interface circuit is configured to receive computer-executable instructions and transmit the computer-executable instructions to the processor. The processor runs the computer-executable instructions to perform the method performed by the first communication device in the method according to the first aspect.

According to a seventh aspect, this application provides a computer-readable storage medium. The computer-readable storage medium is configured to store computer-executable instructions. When the computer-executable instructions are executed, the method performed by the first communication device in the method according to the first aspect is implemented.

According to an eighth aspect, this application provides a computer program product including a computer program. When the computer program is executed, the method performed by the first communication device in the method according to the first aspect is implemented.

According to a ninth aspect, this application provides a communication system. The communication system includes the communication apparatus according to the second aspect, the third aspect, the fourth aspect, the fifth aspect, or the sixth aspect.

BRIEF DESCRIPTION OF DRAWINGS

FIG. 1 is a schematic diagram of an architecture of a spatial multiplexing multiple-input multiple-output system according to an embodiment of this application;

FIG. 2 is a schematic flowchart of a modulation and coding scheme selection method according to an embodiment of this application;

FIG. 6 is a schematic flowchart of another modulation and coding scheme selection method according to an embodiment of this application;

FIG. 8 is a schematic flowchart of another modulation and coding scheme selection method according to an embodiment of this application;

FIG. 9 is a schematic flowchart of another modulation and coding scheme selection method according to an embodiment of this application;

FIG. 10 is a schematic diagram of a BLER prediction network that corresponds to an MU MIMO system according to an embodiment of this application;

DESCRIPTION OF EMBODIMENTS

Figure 3:
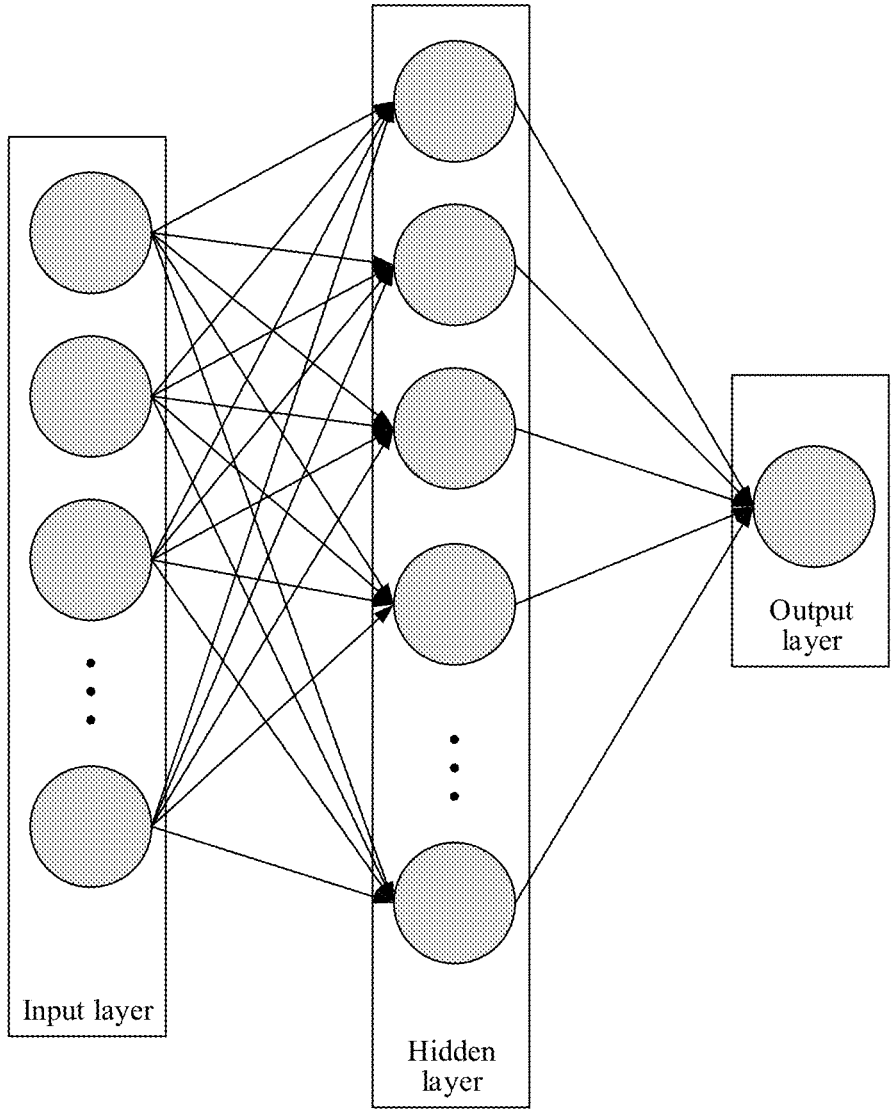
FIG. 3 is a schematic diagram of a structure of a fully connected neural network model according to an embodiment of this application.

To make the objectives, technical solutions, and advantages of this application clearer, the following further describes this application in detail with reference to the accompanying drawings.

In the specification, the claims, and the accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that embodiments described in the specification may be combined with another embodiment.

In this application, "at least one (item)" means one or more, "a plurality of" means two or more, "at least two (items)" means two, three, or more, and "and/or" is used to describe a correspondence relationship between corresponding objects, and indicates that there may be three relationships. For example, "A and/or B" may indicate that only A exists, only B exists, and both A and B exist, where A and B may be singular or plural. The character "/" generally represents an "or" relationship between the corresponding objects. "At least one of the following items (pieces)" or a similar expression thereof refers to any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

To better understand the solutions provided in this application, the following first describes a system architecture in this application.

The methods provided in embodiments of this application may be applied to various communication systems, for example, an internet of things (IoT) system, a narrow band internet of things (NB-IoT) system, a long term evolution (LTE) system, a 5th-generation (5G) communication system, an LTE-5G hybrid architecture, a 5G new radio (NR) system, and a new communication system emerging in future communication development.

FIG. 1 is a schematic diagram of a spatial multiplexing multiple-input multiple-output (MIMO) system according to an embodiment of this application. As shown in FIG. 1, the communication system includes a network device 101 and a terminal device 102. For the MIMO system, a plurality of parallel data streams can be simultaneously transmitted on a same frequency domain resource, and each data stream is referred to as a spatial layer or a spatial stream. It should be learned that a quantity of terminal devices 102 in FIG. 1 is merely an example, and is not specifically limited herein. In other words, when there is one terminal device 102 that simultaneously performs data transmission with the network device 101, the MIMO system is in a single-user multiple-input multiple-output (SU-MIMO) scenario. When the quantity of the terminal devices 102 that simultaneously perform data transmission with the network device 101 is greater than 1, the MIMO system is a multi-user multiple-input multiple-output (MU-MIMO) scenario.

It should be learned that the first communication device mentioned in this application is a signal transmitting end in a communication system, and may be the network device 101 in FIG. 1, or may be the terminal device 102 in FIG. 1.

The terminal device in embodiments of this application is an entity that is on a user side and that is configured to receive or transmit a signal. The terminal device may be a device that provides a user with voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a mobile station (mobile), a remote station, an access point, a remote terminal, an access terminal, a user terminal, a user agent, a user device, user equipment (UE), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or in-vehicle mobile apparatus which exchanges voice and/or data with the radio access network. For example, the terminal device may alternatively be a device such as a personal communication service (PCS) phone, a cordless telephone set, a session initiation protocol (SIP) phone, a wireless local loop (WLL) station, or a personal digital assistant (PDA). Common terminal devices include, for example, a car, a drone, a mechanical arm, a mobile phone, a tablet computer, a notebook computer, a palmtop computer, a mobile internet device (MID), and a wearable device such as a smartwatch, a smart band, or a pedometer. However, embodiments of this application are not limited thereto.

An access network may include one or more network devices. A network device in embodiments of this application is an entity on a network side that is configured to transmit or receive a signal, may be configured to mutually convert a received over-the-air frame and an internet protocol (IP) packet, and serves as a router between a terminal device and a remaining part of the access network. The remaining part of the access network may include an IP network and the like. The network device may further coordinate attribute management of an air interface. For example, the network device may be an evolved NodeB (eNB or e-NodeB) in LTE, may be a new radio controller (NR controller), may be an ng-eNB (new generation-eNB), may be a gNodeB (gNB) in a 5G system, may be a centralized network element (centralized unit), may be a new radio base station, may be a remote radio module, may be a micro base station, may be a relay, may be a distributed network element (distributed unit), may be a reception point (TRP), a transmission point (TP), or any other radio access device. However, this is not limited in this embodiment of this application.

An embodiment of this application provides an MCS selection method. The MCS selection method is as follows: A first communication device predicts, by using a first block error rate prediction model, a predicted block error rate that corresponds to each MCS of a plurality of MCSs at a transmission time interval (TTI) 1. Further, the first communication device determines, from the plurality of MCSs based on the predicted block error rate that corresponds to each MCS, a target MCS that corresponds to the TTI 1, and sends data to a second communication device at the TTI 1 based on the target MCS.

To better understand the solutions provided in this application, the following describes related terms in embodiments of this application.

Modulation and coding scheme (MCS): An MCS table includes a plurality of MCSs, and each MCS includes an MCS index value (which is also referred to as an MCS index) and MCS information that corresponds to the MCS index value. The MCS information includes at least one of the following: a modulation order that corresponds to a modulation scheme, a code rate, a spectral efficiency, and the like. In brief, a signal sending communication device may determine, by using the MCS, a modulation scheme, a code rate, a spectral efficiency, and the like that are used for a to-be-sent data packet.

Channel quality indicator (CQI): A CQI table includes at least one type of CQI, and each type of the CQI includes a CQI index value and CQI information. The CQI information includes at least one of the following: a modulation scheme, a code rate, a spectral efficiency, and a block error rate. There is a mapping relationship between the CQI and the MCS, and a communication device at a transmitting end may determine an MCS by using a CQI of a channel.

Block error rate (BLER): In a wireless network, communication devices exchange data in a form of a transport block. A communication device at a transmitting end calculates a cyclic redundancy check (CRC) 1 by using data in the transport block, and sends the CRC 1 and the transport block to a communication device at a receiving end. After receiving the transport block and the CRC 1, the communication device at the receiving end calculates a CRC 2 based on data in the received transport block, and compares the CRC 2 with the CRC 1. If the CRC 2 is equal to the CRC 1, the communication device at the receiving end returns an acknowledgment character (acknowledgement, ACK) to the communication device at the transmitting end. If the CRC 2 is not equal to the CRC 1, the communication device at the receiving end returns an error character (non-acknowledgement, NACK) to the communication device at the transmitting end, to request the communication device at the transmitting end to retransmit the transport block. The BLER is a ratio of NACK characters to the total characters (ACK characters plus the NACK characters).

OLLA adjustment algorithm: A method of continuously adjusting a CQI accumulated adjustment amount to ensure that a block error rate of a channel reaches a target BLER. For example, when the target BLER is 10%, the OLLA adjustment algorithm may be expressed as a formula (1).

$$CQI_{effect} = CQI_{feedback}(t) + \Delta(t) \qquad (1)$$

$$\Delta(t) = \begin{cases} \Delta(t-1) + 0.01, & ACK \\ \Delta(t-1) - 0.09, & NACK \end{cases}$$

A communication device at a transmitting end determines, based on $CQI_{effect}$ corrected by the OLLA adjustment algorithm, an MCS that corresponds to a current TTI. $CQI_{feedback}(t)$ is a CQI feedback amount (which is also referred to as a CQI measurement amount) of a current channel obtained by a first communication device in a manner in which the first communication device performs equivalent measurement on the current channel using an uplink and downlink reciprocity characteristic of a channel, or in a manner of obtaining measurement feedback of a second communication device. $\Delta(t)$ is a CQI accumulated adjustment amount that corresponds to a current TTI. $\Delta(t-1)$ is a CQI accumulated adjustment amount that corresponds to a previous TTI of the current TTI. A specific calculation manner of $\Delta(t)$ may be as follows: If the communication device at the transmitting end receives an ACK decoding result fed back by a communication device at a receiving end, a current accumulated adjustment amount is increased by 0.01. If the communication device at the transmitting end receives a NACK decoding result fed back by the communication device at the receiving end, a current accumulated adjustment amount is decreased by 0.09. Only when NACK decoding results received by the communication device at the transmitting end and fed back by the communication device at the receiving end account for 10% of total received decoding results, $\Delta(t)$ is 0. In this case, an MCS determined based on $CQI_{feedback}(t)$ may be considered as an MCS that enables optimal transmission performance for the current channel.

The following further describes in detail the modulation and coding scheme selection method provided in embodiments of this application.

FIG. 2 is a schematic flowchart of a modulation and coding scheme (MCS) selection method according to an embodiment of this application. As shown in FIG. 2, the MCS selection method includes the following step 201 to step 203. An execution subject of the method shown in FIG. 2 may be a first communication device, or a chip of the first communication device. FIG. 2 is described by using an example in which the execution subject is the first communication device. An execution subject of the MCS selection method shown in another accompanying drawing in embodiments of this application is similar. Details are not described below.

201: The first communication device predicts, by using a first block error rate prediction model, a predicted block error rate that corresponds to each MCS of a plurality of MCSs at a TTI 1, where a prediction parameter of the predicted block error rate that corresponds to each MCS includes one or more channel parameters and the MCS, and the first block error rate prediction model is a neural network model.

The first communication device and a second communication device may be communication devices in a SU MIMO system or communication devices in an MU MIMO system. When the first communication device is a terminal device, the second communication device is a network device. Alternatively, when the first communication device is a network device, the second communication device is a terminal device.

The TTI 1 may be any TTI used when the first communication device performs transmission to the second communication device. The channel parameter includes: a channel quality indicator (channel quality indicator, CQI) of the TTI 1, a variation between the CQI of the TTI 1 and a CQI of a previous TTI ($\Delta$CQI), a reference signal received power (reference signal received power, RSRP), a precoding matrix indicator (PMI), a rank indicator (RI), a signal transmission speed, a transmission power of a current cell, and/or an RSRP, a PMI, an RI, a speed, and a power of a neighboring cell.

In a possible implementation, the first communication device and the second communication device are communication devices in a SU MIMO system. In this case, channel parameters that correspond to the plurality of MCSs and the TTI 1 and that are obtained by the first communication device include: a CQI, a $\Delta$CQI, an RSRP, an RSRP of a neighboring cell, a PMI, an RI, a speed, and a power.

In another possible implementation, the first communication device and the second communication device are communication devices in a MU MIMO system. In this case, channel parameters that correspond to the plurality of MCSs and the TTI 1 and that are obtained by the first communication device include: a CQI, a $\Delta$CQI an RSRP, an RSRP of a neighboring cell, a PMI, an RI, a speed, a power, a quantity of second communication devices sharing a same channel resource, and/or a correlation coefficient between the second communication devices sharing the same channel resource.

The first communication device obtains an MCS table preconfigured in a communication system, where the MCS table includes a plurality of MCSs. The first communication device may obtain, at the TTI 1, one or more channel parameters of a current channel in a manner in which the first communication device performs equivalent measurement on the current channel by using an uplink and downlink reciprocity characteristic of a channel or in a manner in which the second communication device performs measurement on the current channel and feeds back the parameters to the first communication device. Further, the first communication device may use the channel parameters and the plurality of MCSs as prediction parameters, and input the prediction parameters into a neural network model to predict the predicted block error rate that corresponds to each MCS at the TTI 1. The plurality of MCSs in the prediction parameters may be all MCSs in the MCS table configured in the system, or may be a plurality of MCSs included in a candidate MCS set determined from the MCS table.

In a possible implementation, the first communication device may obtain CQI information of the current channel at the TTI 1. Further, the first communication device may determine, based on the CQI information, the candidate MCS set from the MCS table preconfigured in the communication system. By implementing this possible implementation, the first communication device may reduce a candidate range that corresponds to a target MCS, to save computing resources of the first communication device.

For example, the MCS table preconfigured in the communication system includes at least one piece of MCS information, and the MCS information includes an MCS index value, a quantity of spatial streams, a modulation scheme, and a rate in the MCS table. Details are shown in Table 1. It should be noted that the MCS table herein is merely an example for description, and is not limited thereto.

TABLE 1

| MCS index value | Quantity of spatial streams | Modulation scheme | Rate (Mbit/s) 800 ns GI | Rate (Mbit/s) 400 ns GI |
|---|---|---|---|---|
| 0 | 1 | BPSK 1/2 | 6.5 | 7.2 |
| 1 | 1 | QPSK 1/2 | 13.0 | 14.4 |
| 2 | 1 | QPSK 3/4 | 19.5 | 21.7 |
| 3 | 1 | 16-QAM 1/2 | 26.0 | 28.9 |
| 4 | 1 | 16-QAM 3/4 | 39.0 | 43.3 |
| 5 | 1 | 64-QAM 2/3 | 52.0 | 57.8 |
| 6 | 1 | 64-QAM 3/4 | 58.5 | 65.0 |
| 7 | 1 | 64-QAM 5/6 | 65.0 | 72.2 |
| 8 | 2 | BPSK | 13.0 | 14.4 |
| 9 | 2 | QPSK | 26.0 | 28.9 |
| 10 | 2 | QPSK | 39.0 | 43.3 |
| 11 | 2 | 16-QAM | 52.0 | 57.8 |
| 12 | 2 | 16-QAM | 78.0 | 86.7 |
| 13 | 2 | 64-QAM | 104.0 | 115.6 |
| 14 | 2 | 64-QAM | 117.0 | 130.0 |
| 15 | 2 | 64-QAM | 130.0 | 144.4 |

The first communication device performs the equivalent measurement on the current channel by using the uplink and downlink reciprocity characteristic of the channel, to obtain the CQI information of the current channel. It is assumed that the first communication device determines, from the MCS table preconfigured in the communication system, that an MCS index value that matches the CQI information is an MCS 8. In this case, the first communication device may determine the candidate MCS set in the MCS table by using the MCS 8 as a center and by using a preset step. For example, when the preset step is 5, the first communication device may determine that MCS index values within five steps before and after the MCS 8 in the MCS table are included in the candidate MCS set, in other words, MCS index values included in the determined candidate MCS set are an MCS 3, an MCS 4, an MCS 5, an MCS 6, an MCS 7, the MCS 8, an MCS 9, an MCS 10, an MCS 11, an MCS 12 and an MCS 13.

In a possible implementation, the first communication device obtains at least one piece of training sample data within a training period, where the training sample data includes a channel parameter, an MCS, and a training sample block error rate. The training sample block error rate is obtained based on decoding results (ACK or NACK) that respectively correspond to a plurality of TTIs within the training period. Channel parameters and MCSs that correspond to the plurality of TTIs within the training period are consistent. Further, the first communication device performs model training on an initial neural network model based on the at least one piece of the training sample data, to obtain the first block error rate prediction model. The training period is set by a developer through calculation based on an experimental environment, and may be adjusted correspondingly based on a specific application scenario. The initial neural network model may be a fully connected neural network model, a convolutional neural network model, a recurrent neural network model, or the like. This is not specifically limited herein.

For example, as shown in FIG. 3, the initial neural network model is the fully connected neural network model, and the fully connected neural network includes an input layer, a hidden layer, and an output layer. A quantity of nodes at the input layer is determined based on a quantity of prediction parameters of the network. A quantity of nodes at the hidden layer is usually set to 5 to 10 times the quantity of the nodes at the input layer, and a quantity of nodes at the output layer is 1. Activation functions of the hidden layer and the output layer may be any one of a Sigmoid function, a Tan h function, and a ReLU function. For example, the training period is seven days. The first communication device obtains channel parameters, MCSs, and decoding results that respectively correspond to TTIs (for example, 10000 TTIs) included in the seven days. For specific channel parameters, MCSs, and decoding results that correspond to some TTIs in the training period, refer to Table 2. Table 2 shows data of only the first seven TTIs, and data of other TTIs is omitted. It should be noted that this is merely an example, and this application is not limited thereto. The first communication device may obtain training sample data based on channel parameters, MCSs, and decoding results that correspond to TTIs with a same channel parameter and a same MCS. For example, the first communication device may obtain one piece of the training sample data based on a TTI 0, a TTI 1, and a TTI 2. The training sample data includes a channel parameter, an MCS, and a training sample block error rate. The training sample block error rate is a ratio 33.3% of a quantity of NACKs at the TTI 0, the TTI 1, and the TTI 2 to all decoding results.

TABLE 2

| TTI number | Channel parameter | MCS index value | Decoding result |
|---|---|---|---|
| TTI 0 | A0, B0, C0, and D0 | MCS 0 | ACK |
| TTI 1 | A0, B0, C0, and D0 | MCS 0 | ACK |
| TTI 2 | A0, B0, C0, and D0 | MCS 0 | NACK |
| TTI 3 | A0, B0, C0, and D0 | MCS 1 | NACK |
| TTI 4 | A0, B0, C0, and D0 | MCS 1 | ACK |
| TTI 5 | A1, B1, C1, and D1 | MCS 2 | ACK |
| TTI 6 | A1, B1, C1, and D1 | MCS 2 | ACK |

Further, the first communication device may train, based on the at least one piece of the training sample data in the training period, the initial network model shown in FIG. 3, to obtain the first block error rate prediction model.

Figure 4:
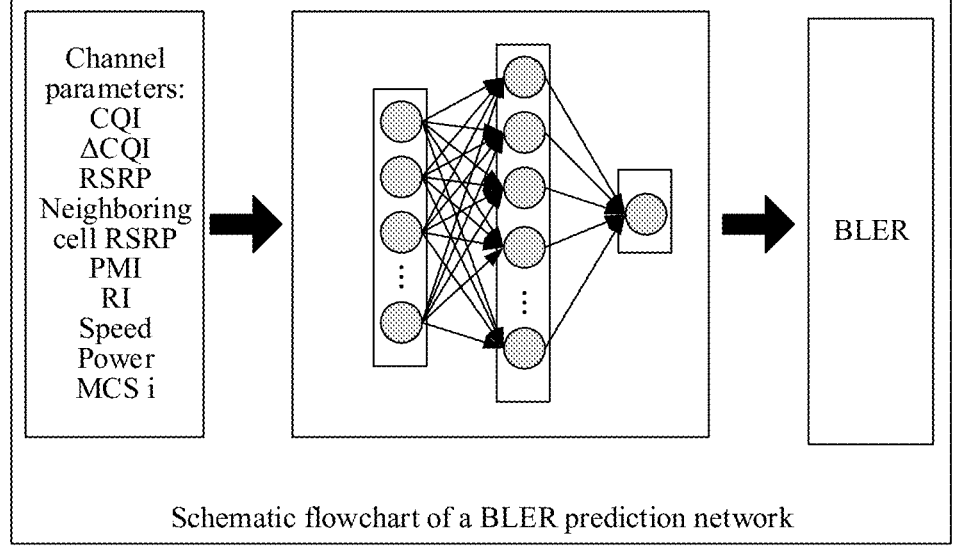
FIG. 4 is a schematic flowchart of a BLER prediction network according to an embodiment of this application.

In an application scenario, after the first communication device obtains the first block error rate prediction model based on the at least one piece of the training sample data in the training period, the first communication device uses each MCS of a plurality of MCSs and a channel parameter that corresponds to the TTI 1 as prediction parameters of the first block error rate prediction model, and inputs the prediction parameters into the first block error rate prediction model, to obtain a predicted block error rate that corresponds to each MCS. As shown in FIG. 4, an MCS i represents an $i^{th}$ MCS in a plurality of MCSs, and may be considered as any one of the foregoing plurality of MCSs. The first communication device inputs the $i^{th}$ MCS and the channel parameter that corresponds to the TTI 1 into the first block error rate prediction model, to obtain a predicted block error rate that corresponds to the $i^{th}$ MCS.

For example, the channel parameter that corresponds to the TTI 1 and that is obtained by the first communication device includes: a CQI, a ΔCQI, and an RSRP and a PMI of a current cell. The plurality of MCSs obtained by the first communication device are an MCS 1, an MCS 2, and an MCS 3. Further, the first communication device invokes the first block error rate prediction model to obtain a predicted BLER 1 based on the channel parameters including the CQI, the ΔCQI, and the RSRP and the PMI of the current cell, and the MCS 1. The first communication device invokes the first block error rate prediction model to obtain a predicted BLER 2 based on the channel parameters including the CQI, the ΔCQI, and the RSRP and the PMI of the current cell, and the MCS 2. The first communication device invokes the first block error rate prediction model to obtain a predicted BLER 3 based on the channel parameters including the CQI, the ΔCQI, and the RSRP and the PMI of the current cell, and the MCS 3.

202: The first communication device determines, from the plurality of MCSs based on the plurality of MCSs and the predicted block error rate that corresponds to each MCS of the plurality of MCSs, the target MCS that corresponds to the TTI 1.

Figure 5:
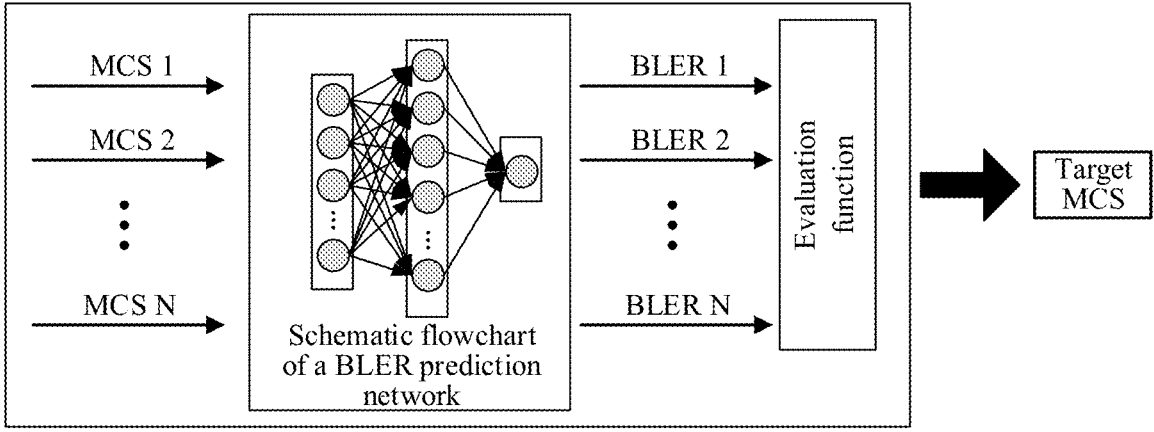
FIG. 5 is a schematic flowchart of determining a target MCS from a plurality of MCSs according to an embodiment of this application.

FIG. 5 is a schematic flowchart of a first communication device determining a target MCS from a plurality of MCSs. After the first communication device predicts, by invoking a first block error rate prediction model, a predicted block error rate that corresponds to each MCS of the plurality of MCSs, the first communication device may determine, from the plurality of MCSs based on an evaluation criterion or an evaluation function, the target MCS that corresponds to a TTI 1. The evaluation criterion or the evaluation function is set by a developer based on an application scenario, and may be adjusted correspondingly based on an actual situation. This is not specifically limited in this application.

In a possible implementation, the target MCS in the foregoing plurality of MCSs and a predicted block error rate that corresponds to the target MCS maximize or improves a spectral efficiency or a throughput of the TTI 1.

For example, after the first communication device predicts, by invoking the first block error rate prediction model, the predicted block error rate that corresponds to each MCS of the plurality of MCSs, the first communication device may obtain, through calculation based on the formula (2) and the predicted block error rate that corresponds to each MCS, a spectral efficiency that corresponds to each MCS.

$$Eff_{MCS}(BLER_{MCS}) = \eta_{MCS} \times (1 - BLER_{MCS}) \qquad (2)$$

$BLER_{MCS}$ is a predicted block error rate that corresponds to an MCS, and a larger MCS index value generally indicates a larger $BLER_{MCS}$. $Eff_{MCS}(BLER_{MCS})$ is a spectral efficiency that corresponds to the MCS. $\eta_{MCS}$ is in a one-to-one correspondence with the MCS, and is an MCS learning rate. Generally, a larger MCS index value indicates a larger $\eta_{MCS}$. Further, the first communication device determines, from the plurality of MCSs based on the spectral efficiency that corresponds to each MCS of the plurality of MCSs, an MCS that corresponds to a maximum spectral efficiency as the target MCS.

For example, the plurality of MCSs obtained by the first communication device are an MCS 1, an MCS 2, and an MCS 3, and the first communication device obtains, based on the first block error rate prediction model, a predicted BLER 1 that corresponds to the MCS 1, a predicted BLER 2 that corresponds to the MCS 2, and a predicted BLER 3 that corresponds to the MCS 3. Further, the first communication device may obtain, based on the formula (2), a $\eta_{MCS1}$ that corresponds to the MCS 1, and the BLER 1, a spectral efficiency value $Eff_{MCS1}$ that corresponds to the MCS 1. The first communication device may obtain, based on the formula (2), a $\eta_{MCS2}$ that corresponds to the MCS 2, and the BLER 2, a spectral efficiency value $Eff_{MCS2}$ that corresponds to the MCS 2. The first communication device may obtain, based on the formula (2), a $\eta_{MCS3}$ that corresponds to the MCS 3, and the BLER 3, a spectral efficiency value $Eff_{MCS3}$ that corresponds to the MCS 3. If the $Eff_{MCS2}$ is a maximum value in the $Eff_{MCS1}$, the $Eff_{MCS2}$, and the $Eff_{MCS3}$, the first communication device determines the MCS 2 that corresponds to the $Eff_{MCS2}$ as the target MCS.

203: The first communication device sends data to the second communication device at the TTI 1 based on the target MCS.

At the TTI 1, the first communication device modulates and codes the data based on MCS information of the target MCS. To be specific, the first communication device modulates and codes the data based on a modulation scheme, a code rate, a spectral efficiency, and the like configured for the target MCS, and sends the data to the second communication device.

It can be learned that, by implementing the modulation and coding scheme (MCS) selection method described in FIG. 2, the first communication device may invoke, based on a channel state measurement amount that corresponds to the TTI 1, the neural network model to predict the predicted block error rate that corresponds to each MCS, and may determine, from the plurality of candidate MCSs based on the predicted block error rate that corresponds to each MCS, the target MCS for improving channel transmission performance.

FIG. 6 is a schematic flowchart of a modulation and coding scheme selection method according to an embodiment of this application. As shown in FIG. 6, the modulation and coding scheme selection method includes the following step 601 to step 605.

601: A first communication device predicts, by using a first block error rate prediction model, a predicted block error rate that corresponds to each MCS of a plurality of MCSs at a TTI 1, where a prediction parameter of the predicted block error rate that corresponds to each MCS includes one or more channel parameters and the MCS, and the first block error rate prediction model is a neural network model.

602: The first communication device determines, from the plurality of MCSs based on the plurality of MCSs and the predicted block error rate that corresponds to each MCS of the plurality of MCSs, a target MCS that corresponds to the TTI 1.

603: The first communication device sends data to a second communication device at the TTI 1 based on the target MCS.

For specific implementations of step 601 to step 603, refer to the specific implementations of step 201 to step 203 in the foregoing embodiment. Details are not described herein again.

604: The first communication device obtains a first block error rate and a second block error rate in a first preset time period, where the first block error rate is an actual statistical block error rate in the first preset time period, and the second block error rate is a predicted block error rate of the first preset time period and that is obtained based on the first block error rate prediction model.

The first preset time period is obtained by a developer based on an experimental scenario, and may be subsequently adjusted correspondingly based on a specific application scenario. This is not specifically limited in this application.

In a possible implementation, the first preset time period includes a plurality of TTIs. The first communication device may obtain a decoding result of each TTI of the plurality of TTIs and a predicted block error rate that corresponds to the target MCS at each TTI. Further, the first communication device may determine the first block error rate based on the decoding result of each TTI, and obtains the second block error rate based on the predicted block error rate that corresponds to the target MCS at each TTI.

For example, the first communication device obtains a decoding result of each of eight TTIs included in the first preset time period and the predicted block error rate that corresponds to the target MCS at each TTI, as shown in Table 3.

TABLE 3

| TTI number | Decoding result | Predicted block error rate that corresponds to the target MCS |
|---|---|---|
| TTI 1 | ACK | 20% |
| TTI 2 | ACK | 20% |
| TTI 3 | ACK | 20% |
| TTI 4 | ACK | 23% |
| TTI 5 | NACK | 25% |
| TTI 6 | ACK | 25% |
| TTI 7 | NACK | 18% |
| TTI 8 | ACK | 24% |

The first communication device may determine a ratio 25% of a quantity 2 of NACK decoding results in the first preset time period to a sum of decoding results 8 as the actual statistical block error rate (namely, the first block error rate) in the first preset time period. The first communication device determines an average value 21.9% of predicted block error rates that correspond to target MCSs at all TTIs in the first preset time period as the predicted block error rate (namely, the second block error rate) obtained in the first preset time period based on the first block error rate prediction model.

605: If a difference between the first block error rate and the second block error rate is greater than or equal to a first threshold, the first communication device determines, based on a target block error rate, an MCS that corresponds to a TTI 2, where the TTI 2 is later than the TTI 1.

The first threshold is set by a developer through calculation based on experimental data, and may be adjusted correspondingly based on to a subsequent specific application scenario. This is not specifically limited herein.

The first communication device determines, based on the difference between the first block error rate (namely, the actual statistical block error rate) and the second block error rate (the predicted block error rate obtained based on the first block error rate prediction model) in the first preset time period, whether to determine, based on the target block error rate, the MCS that corresponds to the next TTI (namely, the foregoing TTI 2). Specifically, when the difference between the first block error rate (namely, the actual statistical block error rate) and the second block error rate (the predicted block error rate obtained based on the first block error rate prediction model) is less than the first threshold, the first communication device continues to determine, based on a first block error rate prediction algorithm, a target MCS that corresponds to the TTI 2. When the difference is greater than or equal to the first threshold, the first communication device determines, based on the target block error rate, the MCS that corresponds to the TTI 2.

For example, the first threshold is 10%. In this case, if the first block error rate (namely, the actual statistical block error rate) obtained by the first communication device in the first preset time period is 30%, and the second block error rate (the predicted block error rate obtained based on the first block error rate prediction model) obtained by the first communication device in the first preset time period is 15%, it can be learned that the difference between the first block error rate and the second block error rate is 15%, and is greater than the first threshold which is 10%. The first communication device may select, based on the target BLER and an OLLA adjustment algorithm, the MCS that corresponds to the next TTI (namely, the TTI 2).

Figure 7:
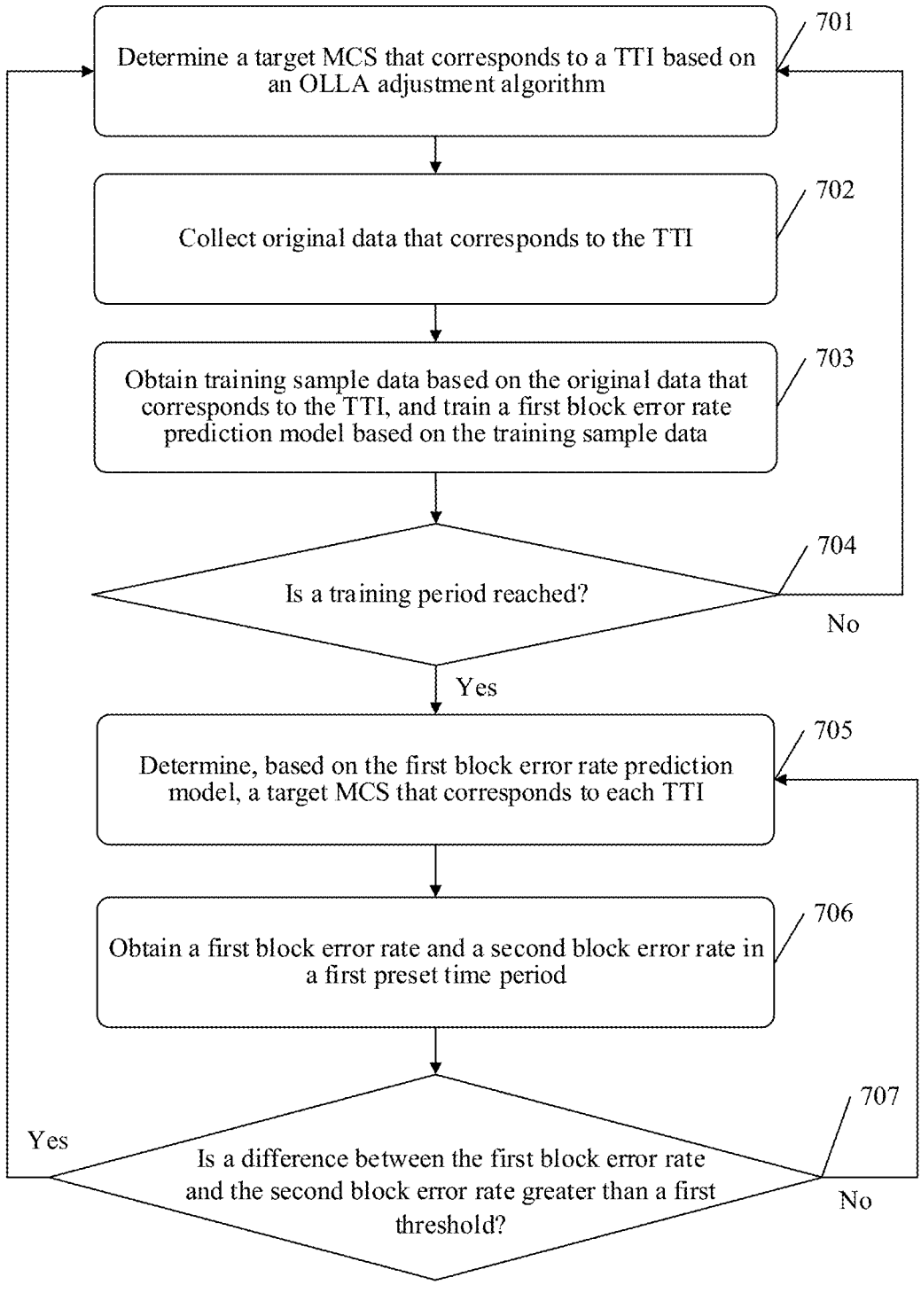
FIG. 7 is a schematic flowchart of another modulation and coding scheme selection method according to an embodiment of this application.

In an application scenario, the first communication device determines, based on the target block error rate, that an MCS selection algorithm that corresponds to a TTI is the OLLA algorithm. In this case, FIG. 7 is a schematic flowchart of another modulation and coding scheme selection method. In FIG. 7, the process the first communication device determines the MCS that corresponds to the TTI is divided into two phases: a training phase of a first block error rate prediction model including step 701 to step 703 and a use phase of the first block error rate prediction model including step 704 to step 705. In the training phase of the first block error rate prediction model, as shown in step 701, the first communication device performs, based on the OLLA adjustment algorithm, accumulated adjustment on a CQI fed back by a second communication device, and determines, based on a CQI after the accumulated adjustment, a target MCS that corresponds to the TTI and that is included in the training phase of the first block error rate prediction model. Further, as shown in step 702, the first communication device collects original data that corresponds to the TTI and that is included in the training phase of the first block error rate prediction model. The original data includes a target MCS and an actual statistical decoding result that correspond to each TTI. Step 701 and step 702 have no forcible execution logic, that is, step 701 and step 702 may be concurrently performed. As shown in step 703, the first communication device obtains at least one piece of training sample data based on the original data that corresponds to the TTI and that is included in the training phase of the first block error rate prediction model, and trains an initial neural network model (for example, the fully connected network model shown in FIG. 3) by using the at least one piece of the training sample data. As shown in step 704, the first communication device detects whether a preset training period is reached. If the preset training period is not reached, the implementation of step 701 is repeated. If the preset training period is reached, the first communication device may obtain the first block error rate prediction model, and enter the use phase of the first block error rate prediction model. To be specific, as shown in step 705, the first communication device determines, based on the first block error rate prediction model, a target MCS that corresponds to each TTI and that is included in the use phase of the first block error rate prediction model. To improve accuracy of the first communication device determining the target MCS that corresponds to the TTI, as shown in step 706, the first communication device obtains a first block error rate (namely, an actual statistical block error rate) in a first preset time period, and obtains a second block error rate (a predicted block error rate obtained based on the first block error rate prediction model) in the first preset time period. Further, as shown in step 707, the first communication device determines whether a difference between the first block error rate and the second block error rate is greater than a first threshold. If the first communication device detects that the difference between the first block error rate and the second block error rate is greater than the first threshold, the first communication device falls back to the training phase of the first block error rate prediction model, to be specific, the first communication device performs the specific implementation of step 701 again to obtain a new first block error rate prediction model through retraining.

It can be learned that, according to the modulation and coding scheme (MCS) selection method described in FIG. 6, the first communication device may periodically monitor model accuracy of the first block error rate prediction model. When it is detected that a prediction result of the first block error rate prediction model is inaccurate, an MCS used for sending data at a subsequent TTI may be determined in another manner, and this improves channel robustness.

FIG. 8 is a schematic flowchart of a modulation and coding scheme selection method according to an embodiment of this application. As shown in FIG. 8, the modulation and coding scheme selection method includes the following step 801 to step 806.

801: A first communication device predicts, by using a first block error rate prediction model, a predicted block error rate that corresponds to each MCS of a plurality of MCSs for a TTI 1, where a prediction parameter of the predicted block error rate that corresponds to each MCS includes one or more channel parameters and the MCS, and the first block error rate prediction model is a neural network model.

802: The first communication device determines, from the plurality of MCSs based on the plurality of MCSs and the predicted block error rate that corresponds to each MCS of the plurality of MCSs, a target MCS that corresponds to the TTI 1.

803: The first communication device sends data to a second communication device at the TTI 1 based on the target MCS.

For specific implementations of step 801 to step 803, refer to the specific implementations of step 201 to step 203 in the foregoing embodiment. Details are not described herein again.

804: The first communication device obtains at least one piece of sample data in a second preset time period, where the sample data includes a channel parameter, an MCS, and a sample block error rate, the sample block error rate is obtained based on decoding results that respectively correspond to a plurality of TTIs, and channel parameters and MCSs of the plurality of TTIs are consistent.

The second preset time period is set by a developer through calculation based on an experimental scenario, and may be subsequently adjusted correspondingly based on a specific application scenario. This is not specifically limited herein.

For example, when the second preset time period is one day. The first communication device obtains channel parameters, MCSs, and decoding results that respectively correspond to the TTIs (for example, 1000 TTIs) included in the one day. The first communication device may obtain sample data based on channel parameters, MCSs, and decoding results that correspond to TTIs with a same channel parameter and a same MCS. For example, if channel parameters and MCSs that correspond to a TTI 0, the TTI 1, and a TTI 2 included in the second preset time period are the same, the first communication device may obtain one piece of sample data based on the TTI 0, the TTI 1, and the TTI 2. A sample block error rate of the sample data is obtained based on decoding results that respectively correspond to the TTI 0, the TTI 1, and the TTI 2.

805: The first communication device adjusts the first block error rate prediction model based on the at least one piece of the sample data, to obtain a second block error rate prediction model.

After determining the target MCS based on a predicted block error rate predicted by the first block error rate prediction model, the first communication device may periodically adjust and optimize the first block error rate prediction model based on the second preset time period, to improve adaptability of the block error rate prediction model to an environment. In other words, the first communication device may use a channel parameter and an MCS that are of each piece of sample data in the second preset time period and that are obtained in step 804 as inputs of the first block error rate prediction model. The first communication device adjusts a model parameter in the first block error rate prediction model based on a predicted block error rate of each piece of the sample data and a difference between a sample block error rate that corresponds to each piece of the sample data and the predicted block error rate of each piece of the sample data, to obtain the second block error rate prediction model.

806: If a parameter variation of the second block error rate prediction model is greater than a second threshold, the first communication device obtains, based on the second block error rate prediction model, a predicted block error rate that corresponds to each MCS of a plurality of MCSs at a TTI 3, where the TTI 3 is later than the TTI 1.

The second threshold is calculated by the developer based on experimental data, and may be subsequently adjusted correspondingly based on a specific application scenario. This is not specifically limited herein. The parameter variation of the second block error rate prediction model refers to a variation of at least one model parameter that corresponds to the second block error rate prediction model relative to at least one model parameter that corresponds to the first block error rate prediction model.

For example, model parameters of the second block error rate prediction model obtained by the first communication device are a parameter A2, a parameter B2, and a parameter C3, and model parameters of the first block error rate prediction model are a parameter A1, a parameter B1, and a parameter C1. In this case, the first communication device may obtain a total parameter variation of the second block error rate prediction model based on a parameter variation of each model parameter. If the total parameter variation of the second block error rate prediction model is greater than the second threshold, the first communication device deletes the first block error rate prediction model, and obtains, based on the second block error rate prediction model, the predicted block error rate that corresponds to each MCS of the plurality of MCSs at the subsequent TTI 3. Further, the first communication device may determine, based on the predicted block error rate that corresponds to each MCS of the plurality of MCSs at the TTI 3, a target MCS that corresponds to the TTI 3.

It should be understood that, in a MIMO system, when there are a plurality of spatial streams between the first communication device and the second communication device, the first communication device may separately determine, by using the same first block error rate prediction model or a same OLLA algorithm, a target MCS that corresponds to each spatial stream.

It can be learned that, by implementing the modulation and coding scheme (MCS) selection method described in FIG. 8, the first communication device continuously collects data in an actual application scenario to train and adjust the first block error rate prediction model, to avoid a case in which the first block error rate prediction model mismatches a changing scenario and improve the accuracy and robustness of the first block error rate prediction model.

FIG. 9 is a schematic flowchart of another modulation and coding scheme (MCS) selection method according to an embodiment of this application. The MCS selection method is applicable to a communication device in an MU MIMO system. As shown in FIG. 9, the modulation and coding scheme (MCS) selection method includes the following step 901 to step 904.

901: A first communication device obtains a plurality of candidate paired sets in the MU MIMO system, where the candidate paired sets include a paired status of one or more second communication devices.

In the MU MIMO system, there are a plurality of second communication devices. The first communication device obtains a plurality of candidate paired sets for the plurality of second communication devices, where each candidate paired set includes each paired status combination of the second communication devices. It should be known that each paired combination status of the second communication devices is a paired status of second communication devices sharing a same channel resource.

For example, in the MU MIMO system, there are three second communication devices: a communication device 1, a communication device 2, and a communication device 3. In this case, there are five candidate paired sets for the three second communication devices, which are shown in Table 4.

TABLE 4

| | |
|---|---|
| Candidate paired set 1 | The second communication device 1, the second communication device 2, and the second communication device 3 share a channel resource 1. |
| Candidate paired set 2 | The second communication device 1 and the second communication device 2 share a channel resource 1, and the second communication device 3 occupies a channel resource 2. |
| Candidate paired set 3 | The second communication device 1 and the second communication device 3 share a channel resource 1, and the second communication device 2 occupies a channel resource 2. |
| Candidate paired set 4 | The second communication device 2 and the second communication device 3 share a channel resource 1, and the second communication device 1 occupies a channel resource 2. |
| Candidate paired set 5 | The communication device 1 occupies a channel resource 1, the communication device 2 occupies a channel resource 2, and a communication device occupies a channel resource 3. |

19                                                    20

902: The first communication device predicts, for each paired status in each candidate paired set by using a first block error rate prediction model, a plurality of predicted block error rates that correspond to each second communication device at a TTI 1 in the paired status. The predicted block error rate in the plurality of predicted block error rates is in a one-to-one correspondence with an MCS in a plurality of MCSs.

In addition to channel parameters in an SU MIMO system, channel parameters in the MU MIMO system further include a quantity n of the second communication devices sharing the same channel resource and a correlation coefficient between the second communication devices sharing the same channel resource. In other words, the channel parameters in the MU MIMO system include: a CQI of the TTI 1, a ΔCQI between the CQI of the TTI 1 and a CQI of a previous TTI, an RSRP, a PMI, an RI, a speed, and a power of a current cell, an RSRP, a PMI, an RI, a speed, and a power of a neighboring cell, the quantity n of the second communication devices sharing the same channel resource, and the correlation coefficient between the second communication devices sharing the same channel resource. FIG. 10 is a schematic diagram of a BLER prediction network that corresponds to an MU MIMO system. A first communication device obtains an MCS table preconfigured in a communication system. The first communication device may further separately obtain, for each paired status in each candidate paired set, one or more channel parameters of a channel resource that corresponds to each second communication device for a TTI 1. The first communication device uses the channel parameters and a plurality of MCSs as prediction parameters, and invokes a neural network model to predict a predicted block error rate at the TTI 1 that corresponds to each MCS and that is of each second communication device.

It should be learned that when a plurality of second communication devices share a same channel resource, channel parameters that correspond to the second communication devices on the current channel and that are obtained by the first communication device have similarities and differences. For example, the candidate paired set 2 in Table 4 is used as an example. A paired status of the candidate paired set is that the second communication device 1 and the second communication device 2 share the channel resource 1, and the second communication device 3 occupies the channel resource 2. In this case, same channel parameters of the second communication device 1 and the second communication device 2 at the TTI 1 include: a quantity 2 of the second communication devices (the second communication device 1 and the second communication device 2) sharing the same channel resource, and a correlation coefficient between the second communication devices (the second communication device 1 and the second communication device 2) sharing the same channel resource. However, remaining channel parameters that correspond to the second communication device 1 at the TTI 1 may be different from remaining channel parameters that correspond to the second communication device 2 at the TTI 1. For a specific implementation of the first communication device predicts a predicted block error rate at the TTI 1 that corresponds to each of the plurality of MCSs and that is for each second communication device, refer to the specific implementation of step 201 in the foregoing embodiment. Details are not described herein again.

903: The first communication device determines, from the plurality of candidate paired sets based on the plurality of MCSs and the plurality of predicted block error rates at the TTI 1 that correspond to each second communication device in each paired status in each candidate paired set, a target paired set that corresponds to the TTI 1 and a target MCS of each second communication device in each paired status in the target paired set.

After obtaining the plurality of predicted block error rates that correspond to each second communication device at the TTI 1 in each paired status in each candidate paired set, the first communication device may determine, from the plurality of MCSs based on a first evaluation criterion or a first evaluation function, a candidate target MCS that corresponds to each second communication device at the TTI 1 in each paired status in each candidate paired set. For a specific implementation in which the first communication device determines, from the plurality of MCSs, the candidate target MCS that corresponds to each second communication device at the TTI 1 in each paired status in each candidate paired set, refer to related descriptions of step 202 in the foregoing embodiment. Details are not described herein again. Further, after the first communication device obtains the candidate target MCS that corresponds to each second communication device at the TTI 1 in each paired status in each candidate paired set, the first communication device may determine, from the plurality of candidate paired sets based on a second evaluation criterion or a second evaluation function that corresponds to the first evaluation criterion or the first evaluation function, the target paired set that corresponds to the TTI 1.

For example, after obtaining the plurality of predicted block error rates that correspond to each second communication device at the TTI 1 in each paired status in each candidate paired set shown in Table 4, the first communication device obtains, through calculation based on the spectral efficiency function shown in the foregoing formula (2) and the plurality of predicted block error rates that correspond to each second communication device at the TTI 1 in each paired status in each candidate paired set, a spectral efficiency that corresponds to each second communication device in each MCS. This is shown in Table 5.

TABLE 5

| | Candidate target MCS and spectral efficiency that correspond to each second communication device | | |
|---|---|---|---|
| Candidate paired set | Second communication device 1 | Second communication device 2 | Second communication device 3 |
| Candidate paired set 1 | MCS 11 and spectral efficiency 1 | MCS 12 and spectral efficiency 2 | MCS 13 and spectral efficiency 3 |
| Candidate paired set 2 | MCS 21 and spectral efficiency 4 | MCS 22 and spectral efficiency 5 | MCS 23 and spectral efficiency 6 |
| Candidate paired set 3 | MCS 31 and spectral efficiency 7 | MCS 32 and spectral efficiency 8 | MCS 33 and spectral efficiency 9 |
| Candidate paired set 4 | MCS 41 and spectral efficiency 10 | MCS 42 and spectral efficiency 11 | MCS 43 and spectral efficiency 12 |
| Candidate paired set 5 | MCS 51 and spectral efficiency 13 | MCS 52 and spectral efficiency 14 | MCS 53 and spectral efficiency 15 |

Further, the first communication device obtains a sum of each spectral efficiency in each candidate paired set based on spectral efficiency that corresponds to each second communication device in a candidate target MCS that corresponds to the second communication device. For example, a sum of each spectral efficiency in the candidate paired set 1 in Table 5 is the sum of the spectral efficiency 1 of the second communication device 1 in the MCS 11, the spectral efficiency 2 of the second communication device 2 in the MCS 12, and the spectral efficiency 3 of the second communication device 3 in the MCS 13. The first communication device may determine, from all the candidate paired sets according to a spectral efficiency maximization rule, a candidate paired set with a maximum sum of spectral efficiency as a target paired set, and determine a candidate target MCS that corresponds to each second communication device in the target paired set as a target MCS that corresponds to each second communication device.

904: The first communication device sends data to the second communication device at the TTI 1 based on the target MCS.

At the TTI 1, the first communication device modulates and codes the data based on MCS information of the target MCS of each second communication device, and sends the data to each second communication device. For another specific implementation of step 904, refer to related descriptions of step 203 in the foregoing embodiment. Details are not described herein again.

It can be learned that by implementing the modulation and coding scheme selection method described in FIG. 9, the first communication device in the MU MIMO system can not only determine an MCS that corresponds to each second communication device at the TTI 1, but also determine a paired combination status of each second communication device at the TTI 1, so that channel transmission performance is further improved.

Figure 11:
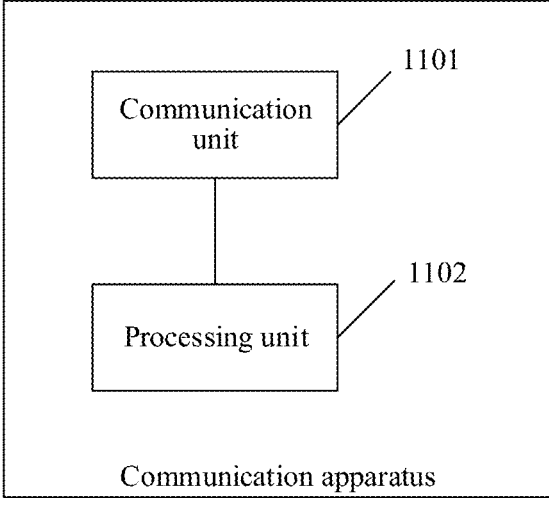
FIG. 11 is a schematic diagram of a structure of a communication apparatus according to an embodiment of this application.

FIG. 11 is a schematic diagram of a structure of a communication apparatus according to an embodiment of this application. The communication apparatus shown in FIG. 11 may be configured to implement a part or all of the functions of a first communication device in an embodiment that corresponds to the modulation and coding scheme selection methods. The communication apparatus shown in FIG. 11 may be configured to implement a part or all of the functions of the first communication device in the method embodiments described in FIG. 2, FIG. 6, FIG. 8, and FIG. 9. The apparatus may be the first communication device, an apparatus in the first communication device, or an apparatus that can be used together with the first communication device. The communication apparatus may alternatively be a chip system. The communication apparatus shown in FIG. 11 may include a communication unit 1101 (e.g., a circuit) and a processing unit 1102 (e.g., a circuit).

The processing unit 1102 is configured to predict, by using a first block error rate prediction model, a predicted block error rate that corresponds to each MCS of a plurality of MCSs for a transmission time interval (TTI) 1. A prediction parameter of the predicted block error rate that corresponds to each MCS includes one or more channel parameters and the MCS, and the first block error rate prediction model is a neural network model. The processing unit 1102 is further configured to determine, from the plurality of MCSs based on the plurality of MCSs and the predicted block error rate that corresponds to each MCS of the plurality of MCSs, a target MCS that corresponds to the TTI 1. The communication unit 1101 is configured to send data to a second communication device at the TTI 1 based on the target MCS.

In a possible implementation, the target MCS in the plurality of MCSs and a predicted block error rate that corresponds to the target MCS maximize a spectral efficiency or a throughput of the TTI 1.

In a possible implementation, after the first communication device sends the data to the second communication device at the TTI 1 based on the target MCS, the processing unit 1102 is further configured to obtain a first block error rate and a second block error rate in a first preset time period, where the first block error rate is an actual statistical block error rate in the first preset time period, and the second block error rate is a predicted block error rate that corresponds to the first preset time period and that is obtained based on the first block error rate prediction model. If a difference between the first block error rate and the second block error rate is greater than or equal to a first threshold, an MCS that corresponds to a TTI 2 is determined based on a target block error rate, where the TTI 2 is later than the TTI 1.

In a possible implementation, the first preset time period includes a plurality of TTIs. The communication unit 1101 is configured to obtain a decoding result of each TTI of the plurality of TTIs and the predicted block error rate that corresponds to the target MCS at each TTI. The processing unit 1102 is configured to: determine the first block error rate based on the decoding result of each TTI; and obtain the second block error rate based on the predicted block error rate that corresponds to the target MCS at each TTI.

In a possible implementation, after the communication unit sends the data to the second communication device at the TTI 1 based on the target MCS, the communication unit 1101 is further configured to obtain at least one piece of sample data in a second preset time period, where the sample data includes a channel parameter, an MCS, and a sample block error rate, the sample block error rate is obtained based on decoding results that respectively correspond to a plurality of TTIs, and channel parameters and MCSs of the plurality of TTIs are consistent. The processing unit 1102 is further configured to: adjust the first block error rate prediction model based on the at least one piece of sample data, to obtain a second block error rate prediction model; and if a parameter variation of the second block error rate prediction model is greater than a second threshold, obtain, based on the second block error rate prediction model, a predicted block error rate that corresponds to each MCS of a plurality of MCSs at a TTI 3, where the TTI 3 is later than the TT1.

In a possible implementation, the channel parameter includes: a channel quality indicator of the TTI 1, a variation between the channel quality indicator of the TTI 1 and a channel quality indicator of a previous TTI, a reference signal received power, a precoding matrix indicator, a rank indicator, a signal transmission speed, and a transmission power of a current cell, and a reference signal received power, a precoding matrix indicator, a rank indicator, a signal transmission speed, or a transmission power of a neighboring cell.

In a possible implementation, the first communication device and the second communication device are communication devices in a multi-user multiple-input multiple-output (MU MIMO) system, and the channel parameter further includes a quantity of second communication devices sharing a same channel resource and a correlation coefficient between the second communication devices.

In a possible implementation, the communication unit 1101 is configured to obtain a plurality of candidate paired sets in the MU MIMO system, where the candidate paired sets include a paired status of one or more second communication devices. The processing unit 1102 is configured to: predict, for each paired status in each candidate paired set by using the first block error rate prediction model, a plurality of predicted block error rates that correspond to each second communication device at the TTI 1 in the paired status, where the predicted block error rate in the plurality of predicted block error rates is in a one-to-one correspondence with the MCS in the plurality of MCSs; and determine, from the plurality of candidate paired sets based on the plurality of MCSs and the plurality of predicted block error rates that correspond to each second communication device at the TTI 1 in each paired status in each candidate paired set, a target paired set that corresponds to the TTI 1 and a target MCS of each second communication device in each paired status in the target paired set.

Figure 12A:
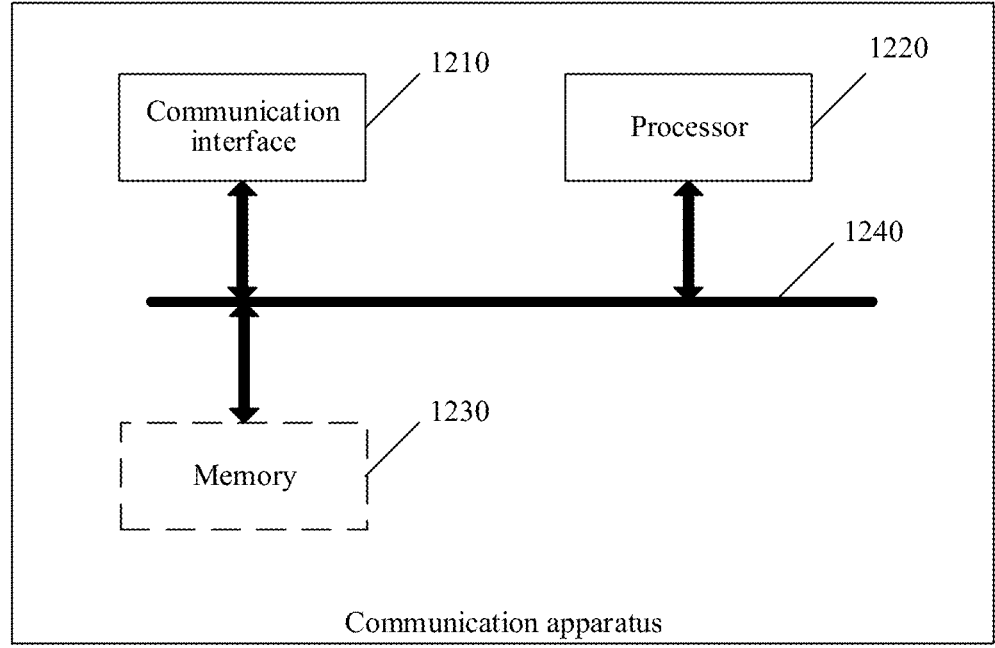
FIG. 12*a* is a schematic diagram of a structure of another communication apparatus according to an embodiment of this application.

FIG. 12a shows a communication apparatus 120 according to an embodiment of this application. The communication apparatus 120 is configured to implement a function of a first communication device in the modulation and coding scheme selection methods. The apparatus may be the first communication device or an apparatus used in the first communication device. The apparatus used in the first communication device may be a chip system or a chip in the first communication device. The chip system may include a chip, or may include a chip and another discrete component.

The communication apparatus 120 includes at least one processor 1220, configured to implement a data processing function of the first communication device in the methods provided in embodiments of this application. The apparatus 120 may further include a communication interface 1210, configured to implement sending and receiving operations of the first communication device in the methods provided in embodiments of this application. In embodiments of this application, the communication interface may be a transceiver, a circuit, a bus, a module, or a communication interface of another type, and is configured to communicate with another device by using a transmission medium. For example, the communication interface 1210 is used by an apparatus in the apparatus 120 to communicate with another device. The processor 1220 receives and sends data through the communication interface 1210, and is configured to implement the methods in the foregoing method embodiments.

The apparatus 120 may further include at least one memory 1230, configured to store program instructions and/or data. The memory 1230 is coupled to the processor 1220. The coupling in this embodiment of this application may be an indirect coupling or a communication connection between apparatuses, units, or modules in an electrical form, a mechanical form, or another form, and is used for information exchange between the apparatuses, the units, or the modules. The processor 1220 may operate in collaboration with the memory 1230. The processor 1220 may execute the program instructions stored in the memory 1230. At least one of the at least one memory may be included in the processor.

In this embodiment of this application, a specific connection medium between the communication interface 1210, the processor 1220, and the memory 1230 is not limited. In this embodiment of this application, the memory 1230, the processor 1220, and the communication interface 1210 are connected through a bus 1240 in FIG. 12a. The bus is represented by a bold line in FIG. 12a. The foregoing is merely an example for description. A connection manner of other components is not limited thereto. The bus may be classified into an address bus, a data bus, a control bus, and the like. For ease of indication, the bus is indicated by using one bold line in FIG. 12a. However, it does not indicate that there is only one bus or only one type of bus.

When the apparatus 120 is the apparatus used in the first communication device, for example, when the apparatus 120 is a chip or a chip system, the communication interface 1210 may output or receive a baseband signal. When the apparatus 120 is the first communication device, the communication interface 1210 may output or receive a radio frequency signal. In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the methods disclosed with reference to embodiments of this application may be directly performed by a hardware processor, or may be performed by using a combination of hardware in the processor and a software module.

Figure 12B:
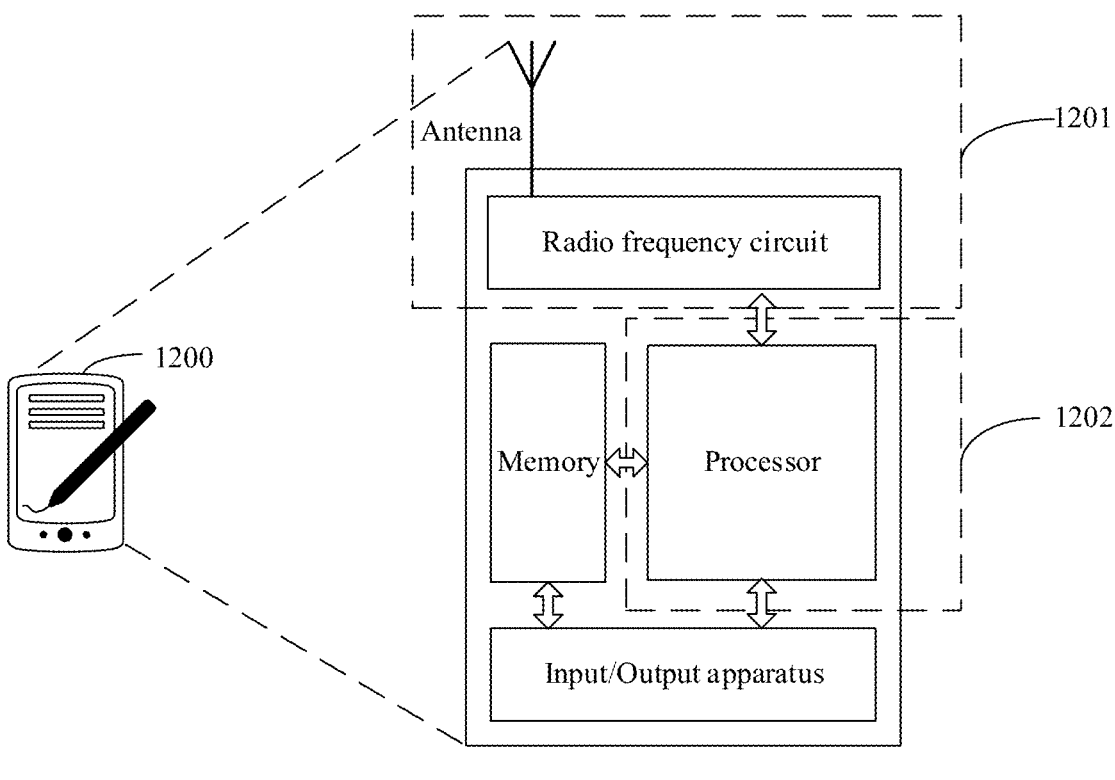
FIG. 12*b* is a schematic diagram of a structure of another communication apparatus according to an embodiment of this application.

For example, a first communication device is a terminal device. FIG. 12b is a schematic diagram of a structure of a terminal device 1200 according to an embodiment of this application. The terminal device may perform an operation performed by the first communication device in the foregoing modulation and coding scheme (MCS) selection methods.

For ease of description, FIG. 12b shows only main components of the terminal communication device. As shown in FIG. 12b, the terminal communication device 1200 includes a processor, a memory, a radio frequency circuit, an antenna, and an input/output apparatus. The processor is mainly configured to: process a communication protocol and communication data, control the entire terminal communication device, execute a software program, and process data of the software program, for example, support the terminal device in performing the procedure described in FIG. 2 or FIG. 7. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The terminal device 1200 may further include the input/output apparatus, for example, a touchscreen, a display screen, or a keyboard. The input/output apparatus is mainly configured to: receive data entered by a user, and output data to the user. It should be noted that some types of first communication devices may have no input/output apparatus.

After the terminal device is powered on, the processor may read the software program in a storage unit, interpret and execute the data of the software program, and process the data of the software program. When data needs to be sent in a wireless manner, the processor performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

Persons skilled in the art may understand that, for ease of description, FIG. 12b shows only one memory and one processor. An actual first communication device may include a plurality of processors and memories. The memory may also be referred to as a storage medium, a storage device, or the like. This is not limited in embodiments of this application.

In an optional implementation, the processor may include a baseband processor and a central processing unit (CPU). The baseband processor is mainly configured to process the communication protocol and the communication data. The CPU is mainly configured to control the entire first communication device, execute the software program, and process the data of the software program. Optionally, the processor may alternatively be a network processor (NP) or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory may include a volatile memory, for example, a random-access memory (RAM). The memory may also include a non-volatile memory, for example, a flash memory, a hard disk drive (HDD), or a solid-state drive (SSD). The memory may further include a combination of the foregoing types of memories.

For example, in this embodiment of this application, as shown in FIG. 12b, an antenna that has a transceiver function and the radio frequency circuit may be considered as a communication unit 1201 of the terminal device 1200, and the processor having a processing function may be considered as a processing unit 1202 of the terminal device 1200.

The communication unit 1201 may also be referred to as a transceiver, a transceiver machine, a transceiver apparatus, a transceiver unit, or the like, and is configured to implement the transceiver function. Optionally, a component that is in the communication unit 1201 and that is configured to implement a reception function may be considered as a receiving unit, and a component that is in the communication unit 1201 and that is configured to implement a transmission function may be considered as a sending unit. In other words, the communication unit 1201 includes the receiving unit and the sending unit. For example, the receiving unit may also be referred to as a receiver machine, a receiver, a receiving circuit, or the like. The sending unit may also be referred to as a transmitter machine, a transmitter, a transmitting circuit, or the like.

In some embodiments, the communication unit 1201 and the processing unit 1202 may be integrated into one device, or may be separated as different devices. In addition, the processor and the memory may be integrated into one device, or may be separated as different devices.

The communication unit 1201 may be configured to perform receiving and sending operations of the terminal device in the foregoing method embodiments. The processing unit 1202 may be configured to perform a data processing operation of the terminal device in the foregoing method embodiments.

An embodiment of this application further provides a computer-readable storage medium. The computer-readable storage medium stores computer-executable instructions. When the computer-executable instructions are executed, the method performed by the terminal device in the foregoing method embodiments is implemented.

An embodiment of this application further provides a computer-readable storage medium. The computer-readable storage medium stores computer-executable instructions. When the computer-executable instructions are executed, the method performed by the first communication device in the foregoing method embodiments is implemented.

An embodiment of this application further provides a computer program product. The computer program product includes a computer program. When the computer program is executed, the method performed by the terminal device in the foregoing method embodiments is implemented.

An embodiment of this application further provides a computer program product. The computer program product includes a computer program. When the computer program is executed, the method performed by the first communication device in the foregoing method embodiments is implemented.

An embodiment of this application further provides a communication system. The communication system includes a terminal device and a first communication device. The terminal device is configured to perform the method performed by the terminal device in the foregoing method embodiments. The first communication device is configured to perform the method performed by the first communication device in the foregoing method embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by persons skilled in the art that embodiments described in this specification all belong to preferable embodiments, and the involved actions and modules are not necessarily required by this application.

Cross reference may be made to descriptions of embodiments provided in this application, and the descriptions of embodiments have different focuses. For a part not described in detail in an embodiment, refer to related descriptions of another embodiment. For ease and brevity of description, for example, for functions and performed steps of the apparatuses and devices provided in embodiments of this application, refer to related descriptions of the method embodiments of this application. The method embodiments and the apparatus embodiments may also be referenced, combined, or cited to each other.

Finally, it should be noted that the foregoing embodiments are merely intended to describe the technical solutions of this application, rather than limit this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A modulation and coding scheme (MCS) selection method, wherein the method comprises:

predicting, by a first communication device by using a first block error rate prediction model, a predicted block error rate that corresponds to each MCS of a plurality of MCSs for a transmission time interval (TTI) 1, wherein a prediction parameter of the predicted block error rate that corresponds to each MCS comprises one or more channel parameters and the MCS, and the first block error rate prediction model is a neural network model;

selecting, by the first communication device based on the plurality of MCSs and the predicted block error rate that corresponds to each MCS of the plurality of MCSs, a target MCS that corresponds to the TTI 1 from the plurality of MCSs;

sending, by the first communication device, data to a second communication device at the TTI 1 based on the target MCS;

obtaining, by the first communication device, a first block error rate and a second block error rate in a first preset time period, wherein the first block error rate is a statistical block error rate in the first preset time period, and the second block error rate is a predicted block error rate that corresponds to the first preset time period and that is obtained based on the first block error rate prediction model; and if a difference between the first block error rate and the second block error rate is greater than or equal to a first threshold, determining, by the first communication device based on a target block error rate, an MCS that corresponds to a TTI 2, wherein the TTI 2 is later than the TTI 1.

2. The method according to claim 1, wherein the target MCS in the plurality of MCSs and the predicted block error rate that corresponds to the target MCS maximize a spectral efficiency or a throughput of the TTI 1.

3. The method according to claim 1, wherein the first preset time period comprises a plurality of TTIs, and the obtaining, by the first communication device, a first block error rate and a second block error rate in a first preset time period comprises:

obtaining, by the first communication device, a decoding result of each TTI of the plurality of TTIs and the predicted block error rate that corresponds to the target MCS at each TTI;

determining, by the first communication device, the first block error rate based on the decoding result of each TTI; and obtaining, by the first communication device, the second block error rate based on the predicted block error rate that corresponds to the target MCS at each TTI.

4. The method according to claim 1, wherein after the sending, by the first communication device, the data to the second communication device at the TTI 1 based on the target MCS, the method further comprises:

obtaining, by the first communication device, at least one piece of sample data in a second preset time period, wherein the sample data comprises a channel parameter, an MCS, and a sample block error rate, the sample block error rate is obtained based on decoding results that respectively correspond to a plurality of TTIs, and channel parameters and MCSs of the plurality of TTIs are consistent;

adjusting, by the first communication device, the first block error rate prediction model based on the at least one piece of sample data, to obtain a second block error rate prediction model; and if a parameter variation of the second block error rate prediction model is greater than a second threshold, obtaining, by the first communication device based on the second block error rate prediction model, a predicted block error rate that corresponds to each MCS of a plurality of MCSs for a TTI 3, wherein the TTI 3 is later than the TTI 1.

5. The method according to claim 1, wherein a channel parameter comprises one or more selected from the following: a channel quality indicator of the TTI 1, a variation between the channel quality indicator of the TTI 1 and a channel quality indicator of a previous TTI, a reference signal received power, a precoding matrix indicator, a rank indicator, a signal transmission speed, and a transmission power of a current cell, and a reference signal received power of a neighboring cell.

6. The method according to claim 5, wherein the first communication device and the second communication device are communication devices in a multi-user multiple-input multiple-output (MU MIMO) system, and the channel parameter further comprises a quantity of second communication devices sharing a same channel resource and a correlation coefficient between the second communication devices.

7. The method according to claim 6, wherein the predicting, by the first communication device by using the first block error rate prediction model, the predicted block error rate that corresponds to each MCS of the plurality of MCSs for the transmission time interval TTI 1 comprises:

obtaining, by the first communication device, a plurality of candidate paired sets in the MU MIMO system, wherein the candidate paired sets comprise a paired status of one or more second communication devices; and predicting, by the first communication device for each paired status in each candidate paired set by using the first block error rate prediction model, a plurality of predicted block error rates at the TTI 1 that correspond to each second communication device in the paired status, wherein the predicted block error rate in the plurality of predicted block error rates is in a one-to-one correspondence with the MCS in the plurality of MCSs; and the selecting, by the first communication device based on the plurality of MCSs and the predicted block error rate that corresponds to each MCS of the plurality of MCSs, the target MCS that corresponds to the TTI 1 from the plurality of MCSs comprises:

selecting, by the first communication device from the plurality of candidate paired sets based on the plurality of MCSs and the plurality of predicted block error rates at the TTI 1 that correspond to each second communication device in each paired status in each candidate paired set, a target paired set that corresponds a target MCS of each second communication device in each paired status in the target paired set.

8. A communication apparatus, comprising:

a memory storage comprising instructions; and one or more processors in communication with the memory storage, wherein the one or more processors execute the instructions to:

predict, by using a first block error rate prediction model, a predicted block error rate that corresponds to each modulation and coding scheme (MCS) of a plurality of MCSs for a transmission time interval (TTI) 1, wherein a prediction parameter of the predicted block error rate that corresponds to each MCS comprises one or more channel parameters and the MCS, and the first block error rate prediction model is a neural network model; determine, from the plurality of MCSs based on the plurality of MCSs and the predicted block error rate that corresponds to each MCS of the plurality of MCSs, a target MCS that corresponds to the TTI 1;

send data to a second communication device at the TTI 1 based on the target MCS;

obtain a first block error rate and a second block error rate in a first preset time period, wherein the first block error rate is a statistical block error rate in the first preset time period, and the second block error rate is a predicted block error rate that corresponds to the first preset time period and that is obtained based on the first block error rate prediction model; and if a difference between the first block error rate and the second block error rate is greater than or equal to a first threshold, determine, based on a target block error rate, an MCS that corresponds to a TTI 2, wherein the TTI 2 is later than the TTI 1.

9. The apparatus according to claim 8, wherein the target MCS in the plurality of MCSs and a predicted block error rate that corresponds to the target MCS maximize a spectral efficiency or a throughput of the TTI 1.

10. The apparatus according to claim 8, wherein the first preset time period comprises a plurality of TTIs; and
wherein the apparatus is configured to:
obtain a decoding result of each TTI of the plurality of TTIs and the predicted block error rate that corresponds to the target MCS at each TTI; and
determine the first block error rate based on the decoding result of each TTI; and obtain the second block error rate based on the predicted block error rate that corresponds to the target MCS at each TTI.

11. The apparatus according to claim 8, wherein after sending the data to the second communication device at the TTI 1 based on the target MCS, the apparatus is further configured to:
obtain at least one piece of sample data in a second preset time period, wherein the sample data comprises a channel parameter, an MCS, and a sample block error rate, the sample block error rate is obtained based on decoding results that respectively correspond to a plurality of TTIs, and channel parameters and MCSs of the plurality of TTIs are consistent; and
adjust the first block error rate prediction model based on the at least one piece of sample data, to obtain a second block error rate prediction model; and if a parameter variation of the second block error rate prediction model is greater than a second threshold, obtain, based on the second block error rate prediction model, a predicted block error rate that corresponds to each MCS of a plurality of MCSs at a TTI 3, wherein the TTI 3 is later than the TT1.

12. The apparatus according to claim 8, wherein a channel parameter comprises one or more selected from the following: a channel quality indicator of the TTI 1, a variation between the channel quality indicator of the TTI 1 and a channel quality indicator of a previous TTI, a reference signal received power, a precoding matrix indicator, a rank indicator, a signal transmission speed, and a transmission power of a current cell, and a reference signal received power of a neighboring cell.

13. The apparatus according to claim 12, wherein the communication apparatus and the second communication device are communication devices in a multi-user multiple-input multiple-output (MU MIMO) system, and the channel parameter further comprises a quantity of second communication devices sharing a same channel resource and a correlation coefficient between the second communication devices.

14. The apparatus according to claim 13, wherein the apparatus is further configured to:
obtain a plurality of candidate paired sets in the MU MIMO system, wherein the candidate paired sets comprise a paired status of one or more second communication devices; and predict, for each paired status in each candidate paired set by using the first block error rate prediction model, a plurality of predicted block error rates that correspond to each second communication device at the TTI 1 in the paired status, wherein the predicted block error rate in the plurality of predicted block error rates is in a one-to-one correspondence with the MCS in the plurality of MCSs; and determine, from the plurality of candidate paired sets based on the plurality of MCSs and the plurality of predicted block error rates that correspond to each second communication device at the TTI 1 in each paired status in each candidate paired set, a target paired set that corresponds to the TTI 1 and a target MCS of each second communication device in each paired status in the target paired set.

15. A non-transitory computer-readable storage medium, wherein the computer-readable storage medium is configured to store computer-executable instructions, and when the computer-executable instructions are executed by one or more processors, causing the one or more processors to perform:
predicting, by using a first block error rate prediction model, a predicted block error rate that corresponds to each modulation and coding scheme (MCS) of a plurality of MCSs for a transmission time interval (TTI) 1, wherein a prediction parameter of the predicted block error rate that corresponds to each MCS comprises one or more channel parameters and the MCS, and the first block error rate prediction model is a neural network model;

determining based on the plurality of MCSs and the predicted block error rate that corresponds to each MCS of the plurality of MCSs, a target MCS that corresponds to the TTI 1 from the plurality of MCSs;

sending data to a second communication device at the TTI 1 based on the target MCS;

obtaining a first block error rate and a second block error rate in a first preset time period, wherein the first block error rate is an actual statistical block error rate in the first preset time period, and the second block error rate is a predicted block error rate that corresponds to the first preset time period and that is obtained based on the first block error rate prediction model; and if a difference between the first block error rate and the second block error rate is greater than or equal to a first threshold, determining based on a target block error rate, an MCS that corresponds to a TTI 2, wherein the TTI 2 is later than the TTI 1.

16. The medium according to claim 15, wherein the target MCS in the plurality of MCSs and a predicted block error rate that corresponds to the target MCS maximize a spectral efficiency or a throughput of the TTI 1.

17. The medium according to claim 15, wherein a channel parameter comprises one or more selected from the following: a channel quality indicator of the TTI 1, a variation between the channel quality indicator of the TTI 1 and a channel quality indicator of a previous TTI, a reference signal received power, a precoding matrix indicator, a rank indicator, a signal transmission speed, and a transmission power of a current cell, and a reference signal received power of a neighboring cell.

* * * * *